US009228390B2

(12) United States Patent
Lee et al.

(10) Patent No.: US 9,228,390 B2
(45) Date of Patent: Jan. 5, 2016

(54) SAFETY DOOR

(76) Inventors: Ye Myung Lee, Goyang-si (KR); Min Jung Suh, Seoul (KR)

( * ) Notice: Subject to any disclaimer, the term of this patent is extended or adjusted under 35 U.S.C. 154(b) by 0 days.

(21) Appl. No.: 14/397,487

(22) PCT Filed: May 2, 2012

(86) PCT No.: PCT/KR2012/003404
§ 371 (c)(1),
(2), (4) Date: Oct. 27, 2014

(87) PCT Pub. No.: WO2013/165035
PCT Pub. Date: Nov. 7, 2013

(65) Prior Publication Data

US 2015/0121761 A1 May 7, 2015

(30) Foreign Application Priority Data

Apr. 30, 2012 (KR) ........................ 10-2012-0045855

(51) Int. Cl.
*B60J 5/00* (2006.01)
*E06B 5/12* (2006.01)
(Continued)

(52) U.S. Cl.
CPC ... *E06B 5/12* (2013.01); *E05D 7/00* (2013.01); *E05D 15/48* (2013.01); *E06B 3/5054* (2013.01); *E06B 3/92* (2013.01); *E06B 5/00* (2013.01);
(Continued)

(58) Field of Classification Search
CPC ............... E06B 5/12; E06B 3/92; E06B 5/00; E06B 3/5054; E06B 9/00; E06B 7/28; E06B 7/18; E05D 7/00; E05D 15/48
USPC ............. 49/460, 462, 124, 406, 70, 104, 142, 49/143, 168, 169, 170, 174, 175, 207, 323, 49/372, 383
See application file for complete search history.

(56) References Cited

U.S. PATENT DOCUMENTS

| | | | | |
|---|---|---|---|---|
| 1,073,160 A * | 9/1913 | Newpher | ........................ | 52/645 |
| 2,026,886 A * | 1/1936 | Goeltz et al. | .................... | 49/372 |

(Continued)

FOREIGN PATENT DOCUMENTS

| | | | | |
|---|---|---|---|---|
| DE | 1079816 * | 4/1960 | | |
| JP | 06048294 A * | 2/1994 | ................ | B61B 1/02 |

(Continued)

OTHER PUBLICATIONS

International Search Report in International Application No. PCT/KR2012/003404, dated Jan. 22, 2013.

*Primary Examiner* — Jerry Redman
(74) *Attorney, Agent, or Firm* — Park, Kim & Suh, LLC

(57) ABSTRACT

There is provided a safety door having a rotary body hinged to a door frame and a slider overlapping with an end of the rotary body. The safety door includes a fastening portion provided on at least one surface of an overlapping region of the rotary body and the slider, thus preventing separation and deformation of the overlapping region and guiding a movement of the slider, and a stopper preventing the slider from being removed from the rotary body and fixing or restricting a position of the slider. The rotary body and the slider decrease a width of a door by an overlapping movement of a female guide groove and a male protrusion. The safety door further includes a resilient pad provided between the protrusion and the guide groove and supporting an impact generated by a reduction in the width of the door.

25 Claims, 21 Drawing Sheets

(51) Int. Cl.

| | |
|---|---|
| ***E06B 7/28*** | (2006.01) |
| ***E06B 7/36*** | (2006.01) |
| ***E05D 7/00*** | (2006.01) |
| ***E05D 15/48*** | (2006.01) |
| ***E06B 3/50*** | (2006.01) |
| ***E06B 3/92*** | (2006.01) |
| ***E06B 5/00*** | (2006.01) |
| ***E06B 7/18*** | (2006.01) |
| ***E06B 9/00*** | (2006.01) |
| *E06B 7/21* | (2006.01) |
| *E06B 3/70* | (2006.01) |

(52) U.S. Cl.
CPC ... *E06B 7/18* (2013.01); *E06B 7/28* (2013.01); *E06B 7/36* (2013.01); *E06B 9/00* (2013.01); *E06B 7/21* (2013.01); *E06B 2003/7094* (2013.01); *E06B 2003/7096* (2013.01)

(56) References Cited

U.S. PATENT DOCUMENTS

| | | | | | |
|---|---|---|---|---|---|
| 2,747,237 | A * | 5/1956 | Du Plessis | ...................... | 49/383 |
| 3,160,448 | A * | 12/1964 | Abernathy et al. | ............. | 384/23 |
| 4,103,458 | A * | 8/1978 | Booker | ............................ | 49/56 |
| 4,314,733 | A * | 2/1982 | Smith | ........................... | 312/183 |
| 5,066,079 | A * | 11/1991 | Lawrence | ..................... | 312/204 |
| 5,983,570 | A * | 11/1999 | Brown | ......................... | 49/475.1 |
| 6,061,961 | A * | 5/2000 | Rupe | ............................... | 49/164 |
| 6,164,013 | A * | 12/2000 | Ramsey | ............................ | 49/70 |
| 6,550,828 | B2 * | 4/2003 | Warden | ......................... | 292/288 |
| 7,165,595 | B2 * | 1/2007 | Yamamoto | ...................... | 160/97 |
| 2010/0242366 | A1 * | 9/2010 | Liebscher et al. | .............. | 49/142 |
| 2011/0011000 | A1 * | 1/2011 | Weissofner | ..................... | 49/383 |
| 2011/0023365 | A1 * | 2/2011 | Kilfoyle | ............................ | 49/70 |
| 2011/0203179 | A1 * | 8/2011 | Boens | ............................. | 49/142 |
| 2014/0325913 | A1 * | 11/2014 | Schmitt | ........................... | 49/383 |
| 2015/0059249 | A1 * | 3/2015 | Yulkowski | ........................ | 49/31 |

FOREIGN PATENT DOCUMENTS

| | | | |
|---|---|---|---|
| JP | 2006-125111 | A | 5/2006 |
| KR | 20-0283749 | Y1 | 7/2002 |
| KR | 20-0312097 | Y1 | 5/2003 |
| KR | 10-0894305 | B1 | 4/2009 |
| KR | 10-2011-0030258 | A | 3/2011 |

* cited by examiner (A)

(B)

(A)

(B)

(A)

(B)

(A)

(B)

(A)

(B)

SAFETY DOOR

CROSS-REFERENCE TO RELATED APLLICATIONS

This application is the National Stage filing under 35 U.S.C. 371 of International Application No. PCT/KR2012/003404, filed on May 2, 2012, which claims the benefit of Korean Patent Application No. 10-2012-0045855, filed on Apr. 30, 2012, the contents of which are all hereby incorporated by reference herein in their entirety.

TECHNICAL FIELD

The present invention relates, in general, to safety doors and, more particularly, to a safety door, in which a width of a door is reduced, thus preventing an accident wherein part of the body is caught between the door and a door frame, and in which the door is provided with a fastening portion, thus allowing a rotary body and a slider to move smoothly relative to each other, and preventing the separation and deformation of an overlapping region, and in which a pad is further provided between the rotary body and the slider, thus ensuring smooth sliding and absorbing impacts, in addition to providing soundproof effect and insulation effect.

BACKGROUND ART

Generally, a hinged door is installed to allow a person to go into and out of an area defined by a wall. The door is commonly composed of a door frame that is mounted to the wall, and a door that is coupled to the door frame via a hinge.

Such a hinged door is being used in an entrance to a room of a house as well as in various workplaces (e.g. schools, child care centers, offices, etc.).

However, a conventional hinged door is problematic in that, when the door is unintentionally closed by wind pressure or by mistake, part of the body may be caught between the door and the door frame.

Further, when the door is closed by wind pressure, as the door approaches the door frame, a speed at which the door is closed by wind pressure is abruptly increased in proportion to the size of the door.

Thus, if an article or person is located within the rotation radius of the door when the door is closed by wind pressure, it may cause an accident wherein the person may be knocked over or hit by the door or part of the body may be caught between the door and the door frame, thus leading to an injury.

Particularly if a child is knocked over or hit by the door that is closed by wind pressure or part of his or her body is caught between the door and the door frame, he or she may be seriously injured.

DISCLOSURE

Technical Problem

Accordingly, the present invention has been made keeping in mind the above problems occurring in the related art, and is intended to provide a safety door, which is configured such that an end thereof slides in a widthwise direction, thus enabling a reduction in width of a door, and thereby preventing an accident wherein part of the body is caught between a door frame and the door; and additionally decreasing a closing speed due to a reduction in frictional area between the door and the air.

Further, the present invention serves to provide a safety door, in which a protrusion and a guide groove engage with each other via a fastening portion of a locking structure, thus preventing the separation of a cover from the protrusion or a deformation, and in which an effective coupling is ensured between a rotary body and a slider, and in which it is possible to provide an aesthetic appearance to an overall door.

Furthermore, the present invention is intended to provide a safety door, in which a resilient pad is further provided between a protrusion and a guide groove, thus smoothly supporting a reduction or extension in width of a door, and particularly achieving an excellent insulation effect, in addition to reducing impacts and noise.

Further, the present invention serves to provide a safety door, which further includes a guide portion to guide the movement of a slider, thus minimizing friction and ensuring smooth movement when the slider moves.

Furthermore, the present invention is intended to provide a safety door, in which a fixing member is further provided on a surface of a door contacting a door frame, thus keeping the door closed even when a width of the door is reduced or extended.

Technical Solution

In an aspect, the present invention provides a safety door having a rotary body hinged to a door frame, and a slider overlapping with an end of the rotary body and coupled thereto in such a way as to move leftwards and rightwards, the safety door including: a fastening portion provided on at least one surface of an overlapping region of the rotary body and the slider, thus preventing separation and deformation of the overlapping region and guiding a movement of the slider; and a stopper preventing the slider from being removed from the rotary body, and fixing or restricting a position of the slider, wherein the rotary body and the slider decrease a width of a door by an overlapping movement of a female guide groove and a male protrusion, the safety door further including a resilient pad provided between the protrusion and the guide groove and supporting an impact generated by a reduction in the width of the door.

The pad may be made of a resilient material, and may be any one selected from a group including paper and polymer which are continuously curved in a horizontal direction, and sponge.

The pad may have a resilient diamond shape or hexagonal honeycomb shape by symmetrically connecting at least one elastic member, with ridges and furrows of the elastic member continuously formed in a moving direction of the slider.

The fastening portion may include at least fastening projection provided on either of at least one surface of the protrusion and a cover of the guide groove contacting the surface in such a way as to be spaced apart from each other by a predetermined interval in a vertical direction; and a fastening groove provided on a remaining one to slidably engage with the fastening projection in the horizontal direction.

The safety door may further include a plurality of rollers provided on a surface of the protrusion or the guide groove; and a rail supporting the rollers, or provided on a corresponding surface, having the rollers, to support the rollers.

The stopper may include at least one locking step formed on at least one surface of the protrusion or the guide groove; and a locking projection formed on a corresponding surface that faces the locking step, whereby, when the slider moves leftwards and rightwards, the locking projection may be supported by the locking step, and thus the width of the door may be restricted not to be extended beyond an inner size of the door frame.

The stopper may include at least one seating groove formed in at least one surface of the protrusion or the guide groove; and an elastic ball formed on a corresponding surface that faces the seating groove.

The stopper may include at least one seating groove formed in at least one surface of the protrusion or the guide groove; and an elastic ball formed on a corresponding surface that faces the seating groove, whereby, as the slider moves leftwards and rightwards, the elastic ball may be elastically supported by the seating groove, and a position of the slider can be adjusted in stages according to a position and a number of the seating groove.

The stopper may include at least one seating groove formed in at least one surface of the protrusion or the guide groove; and an elastic ball formed on a corresponding surface that faces the seating groove.

The stopper may be provided on the rotary body or the slider equipped with the rail, and may include a locking hook provided on one end thereof and supported by an outside of any one of the plurality of rollers, a pressing piece provided on the other end and protruding outwards by a predetermined length from a surface at which the stopper is installed, thus being pressed against the door frame when the door is dosed, and an elastic body provided between the locking hook and the pressing piece.

The safety door may further include a guide portion provided on at least an upper portion of the door or on each of upper and lower portions thereof, thus guiding the overlapping of the rotary body with the slider.

The guide portion may include a tubular guide rail coupled with the rotary body, and a roller portion having a plurality of guide rollers that are continuously arranged, slidably moved into the guide rail, and coupled with the slider.

The door may further include a fixing member elastically provided on at least either of the rotor and the slider contacting the door frame to facilitate an elastic opening or closing operation from the door frame.

The stopper may be provided on at least the upper portion of the door or on each of the upper and lower portions thereof.

Advantageous Effects

The following effects can be achieved by the configuration of the present invention.

The safety door according to the present invention is configured such that the end thereof slides in the widthwise direction, thus enabling the reduction in width of the door, and thereby preventing the accident wherein part of the body is caught between the door frame and the door, and additionally decreasing the closing speed due to the reduction in frictional area between the door and the air.

Further, the safety door of the present invention is configured such that the protrusion and the guide groove engage with each other via the fastening portion of the locking structure, thus preventing the separation of the cover from the protrusion or the deformation, and such that an effective coupling is ensured between the rotary body and the slider, and such that it is possible to provide the aesthetic appearance to the overall door.

Furthermore, the safety door of the present invention is configured such that the resilient pad is further provided between the protrusion and the guide groove, thus smoothly supporting a reduction or extension in width of the door, and particularly achieving the excellent insulation effect, in addition to reducing the impacts and the noise.

Further, the safety door of the present invention further includes the guide portion to guide the movement of the slider, thus minimizing the friction and ensuring the smooth movement when the slider moves.

Furthermore, the safety door of the present invention is configured such that the fixing member is further provided on a surface of the door contacting the door frame, thus keeping the door closed even when the width of the door is reduced or extended.

BEST MODE

Hereinbelow, preferred embodiments of the present invention will be described in detail with reference to the accompanying drawings. In the following description, it is to be noted that, when the detailed description of known configuration or function related with the present invention may make the gist of the present invention unclear, a detailed description thereof will be omitted.

The terminologies used in the description of the present invention are defined in consideration of the function of the present invention. Since the terminologies will be varied according to the intention of those skilled in the art or by usage, they should be defined based on the overall contents of the specification.

Figure 1:
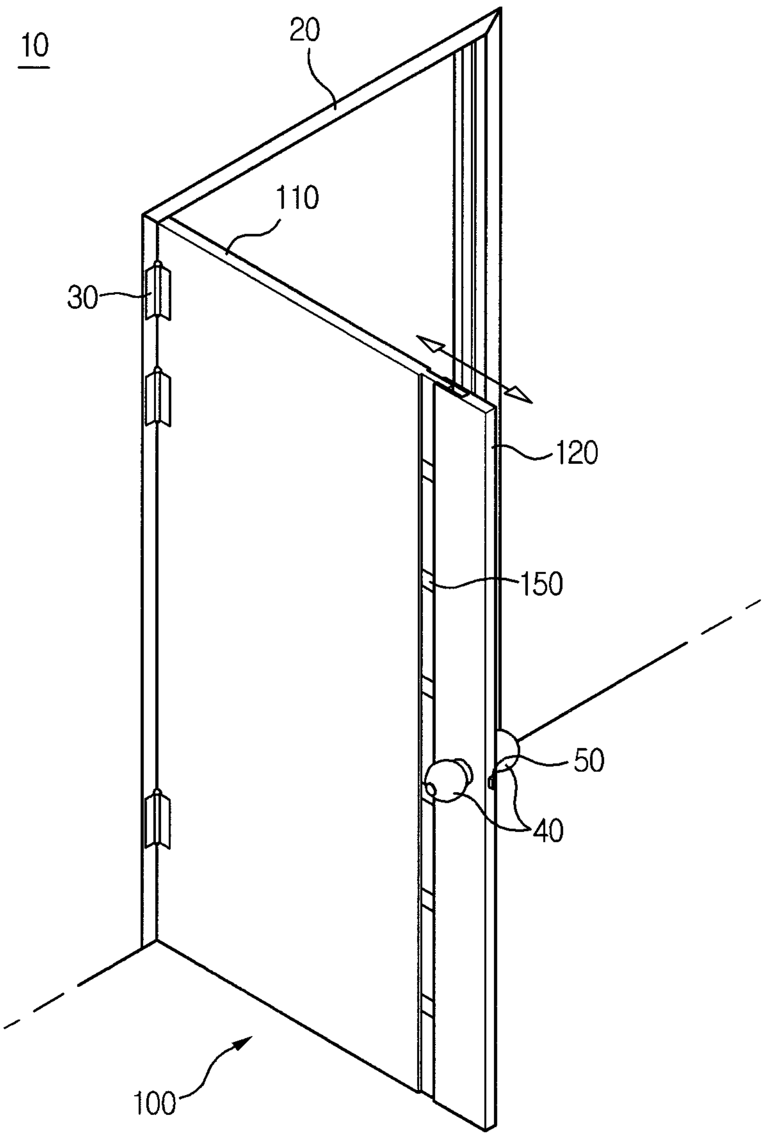
FIG. 1 is a perspective view illustrating a safety door according to a preferred embodiment of the present invention.

FIG. 1 is a perspective view illustrating a safety door according to a preferred embodiment of the present invention As shown in the drawing, a hinged door 10 is configured such that a width of a door 100 coupled to a door frame 20 via a hinge 30 is varied. Thus, such a configuration prevents an accident wherein part of the body is caught between the door frame 20 and the door 100, even when the door 100 is closed by an unintended situation, wind pressure or the like.

Further, when the door is closed by the unintended situation, especially wind pressure, the width of the door 100 is reduced, so that a frictional area against wind pressure is minimized and thereby a closing speed is reduced and impacts on the door frame 20 are minimized.

The door frame 20 is mounted to a wall surface, and may use an existing door frame or a new door frame. Since the door frame has the same shape as the conventional door frame, a detailed description thereof will be omitted herein.

The door 100 is coupled to the door frame 20 via the hinge 30, and includes a rotary body 110 that rotates about the hinge 30, a slider 120 that is movably coupled to an end of the rotary body 110, and a fastening portion 150 that allows for the smooth movement of the slider 120.

Figure 10:
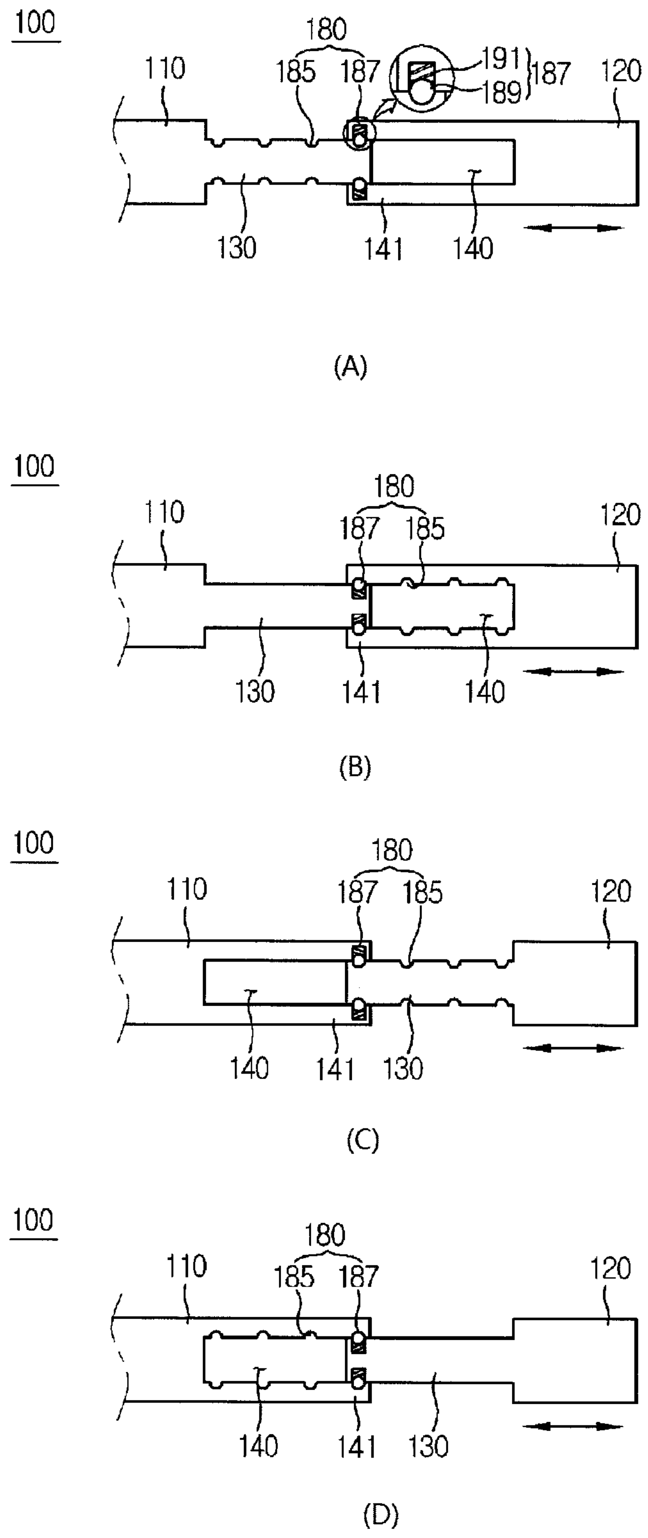
FIG. 10 is a plan view showing the door to illustrate an example of a stopper according to the preferred embodiment of the present invention.

Further, the door additionally includes a knob 40 that allows the door 100 to be easily opened or closed, and a fixing member 50 that keeps the door 100 closed. The fixing member 50 may be operated in conjunction with the knob 40 or in an independent structure. As shown in FIG. 10, the fixing member is preferably an elastic ball 187 composed of an elastic body 191 and a ball 189.

Figure 2:
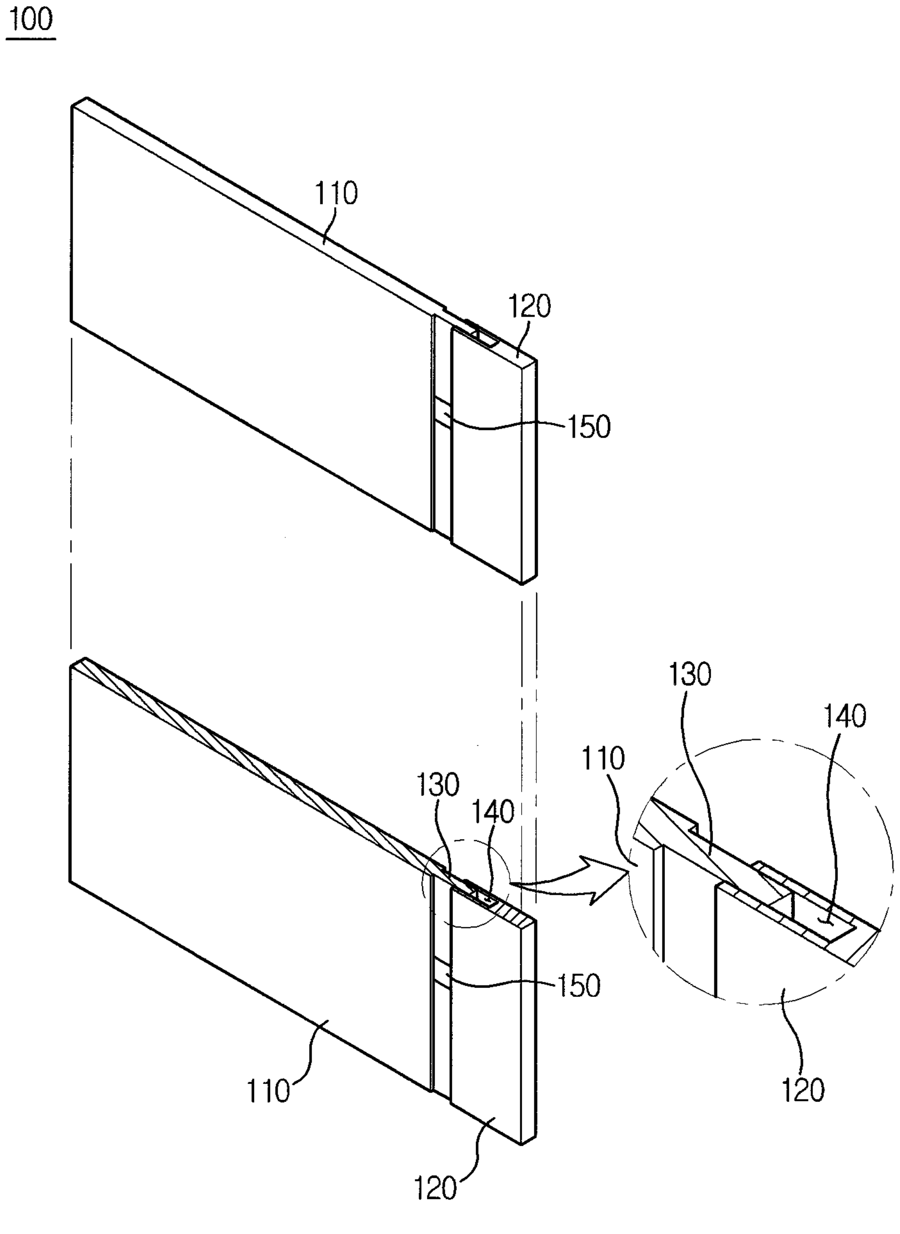
FIG. 2 is a perspective view illustrating another example of a door according to the preferred embodiment of the present invention.

Such a door 100 may have a solid configuration wherein the rotary body 110 and the slider 120 are made as shown in FIG. 2. A male protrusion 130 and a female guide groove 140 are provided on facing ends of the rotary body 110 and the slider 120.

Figure 4:
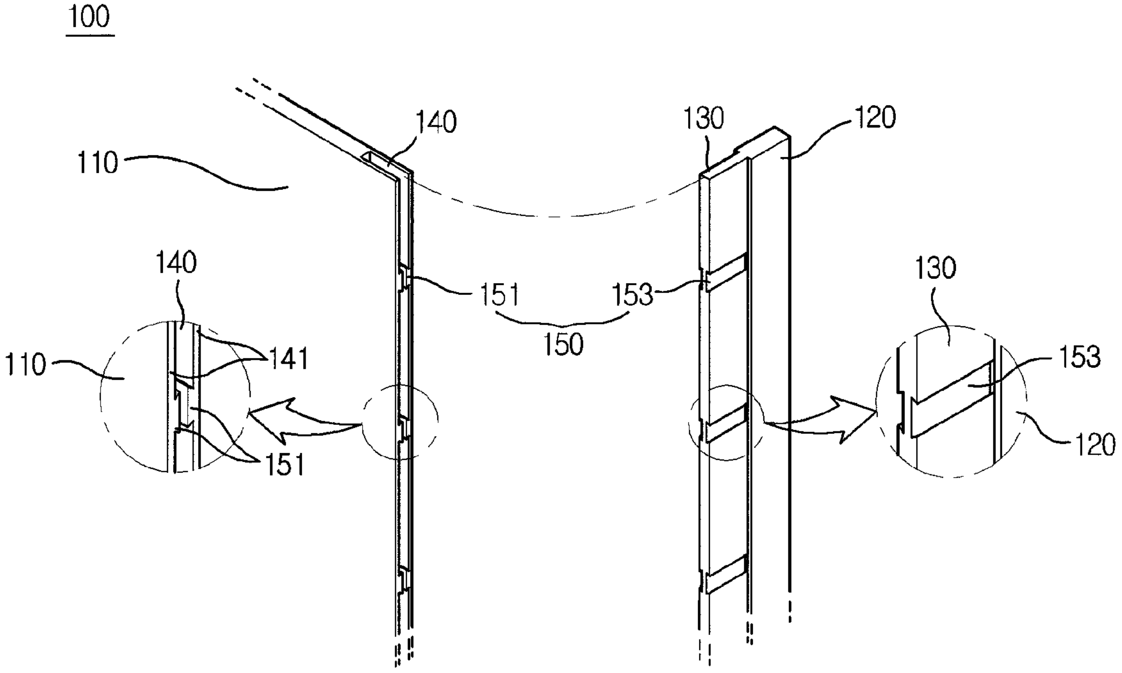
FIG. 4 illustrates a second coupling state of the door according to the preferred embodiment of the present invention in a plan view and a perspective view.
Figure 4:
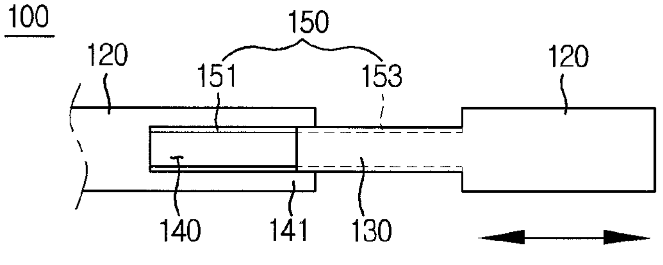

Here, the protrusion 130 is an area extending from the end of the rotary body 110, as shown in the drawing. The guide groove 140 is an area receiving the protrusion 130 therein, and is a concave area that is formed on a surface facing the end of the rotary body 110. The shape and position of the protrusion 130 and the guide groove 140 may be changed in such a way that they correspond to each other. In other words, the protrusion and the guide groove may be formed as shown in FIG. 4. A detailed description thereof will be provided later.

The fastening portion 150 comprises male and female structures on respective surfaces of the protrusion 130 and the guide groove 140 that come into contact with each other. This will be described with reference to FIG. 3.

Figure 3:
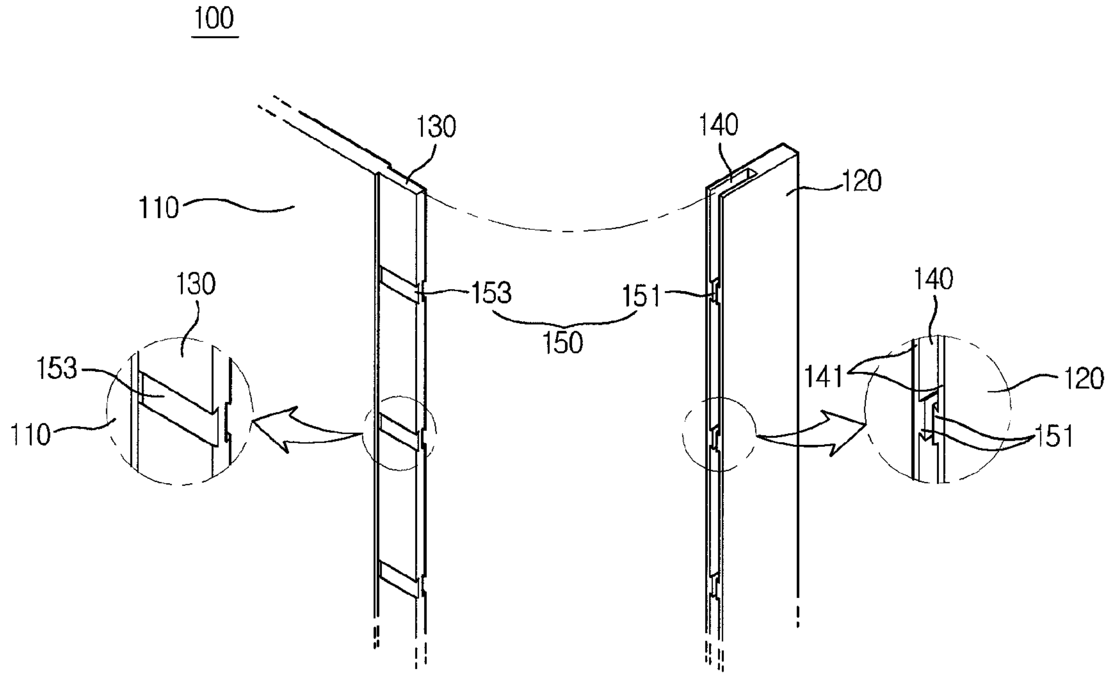
FIG. 3 illustrates a first coupling state of the door according to the preferred embodiment of the present invention in a plan view and a perspective view.
Figure 3:
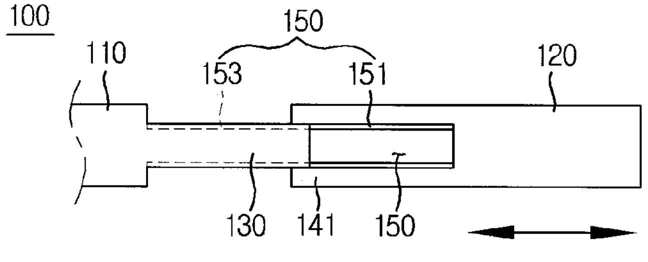

FIG. 3 illustrates a first coupling state of the door according to the preferred embodiment of the present invention in a plan view and a perspective view.

As shown in the drawing, the fastening portion 150 comprises male and female structures on respective surfaces of the protrusion 130 and the guide groove 140 that come into contact with each other, thus guiding the movement of the slider 120, and particularly preventing the cover 141 contacting the protrusion from being deformed due to temperature or humidity.

That is, this allows the protrusion 130 and the cover 141 to be smoothly moved to come into close contact with each other, and particularly minimizes the deformation of the cover 141 due to the temperature, humidity and external impacts, thus providing a good appearance to the door 100.

As shown in FIG. 3A, such a fastening portion 150 includes a concave fastening groove 153 and a convex fastening projection 151 corresponding thereto, which have corresponding male and female structures.

One or more fastening grooves 153 are formed at regular intervals in a longitudinal direction of the protrusion 130. The fastening grooves are provided, respectively, on at least both sides of the protrusion 130.

Such a fastening groove 153 has a polygonal shape. That is, it may have a trapezoidal shape as shown in the drawing. However, although not shown in the drawing, it may preferably have an asymmetric structure, such as a diamond or a triangle. It is very preferable that the fastening projection 151 have a shape corresponding to that of the fastening groove 153.

Thus, as shown in FIG. 3B, the slider 120 may be smoothly moved via the fastening portion 150. Particularly, it is possible to minimize the deformation of the cover, which is caused by external factors, such as the temperature/humidity and impacts, thus providing the aesthetic appearance to the door 100, in addition to preventing its function from being deteriorated.

Meanwhile, the concave and convex shape or position of the fastening portion 150 may be selected as desired.

That is, as shown in FIG. 3, the concave fastening groove 153 is formed on the protrusion 130, and the convex fastening projection 151 is formed on the guide groove 140, namely, the inner surface of the cover 141. However, this invention is not limited thereto. Although not shown in the drawings, the convex fastening projection 151 may be formed on the protrusion 130, and the concave fastening groove 153 may be formed in the cover 141.

Likewise, the protrusion 130 and the guide groove 140 may be formed such that their shapes correspond to each other, as shown in FIG. 4.

That is, as shown in FIG. 4, the protrusion 130 is formed on the end of the slider 120 facing the rotary body 110, and the guide groove 140 is provided on the end of the rotary body 110 corresponding thereto, so that they are moved to overlap each other, thus allowing the width of the door 100 to be reduced.

Here, the fastening portion 150 may be formed as shown in the drawing, or may be present in a shape corresponding thereto.

Figure 5:
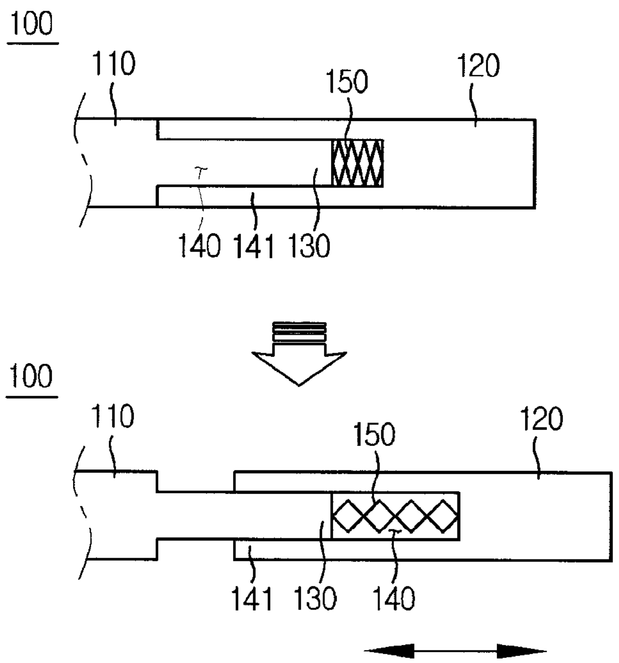
FIG. 5 is a plan view showing the door to illustrate a pad according to the preferred embodiment of the present invention.
Figure 5:
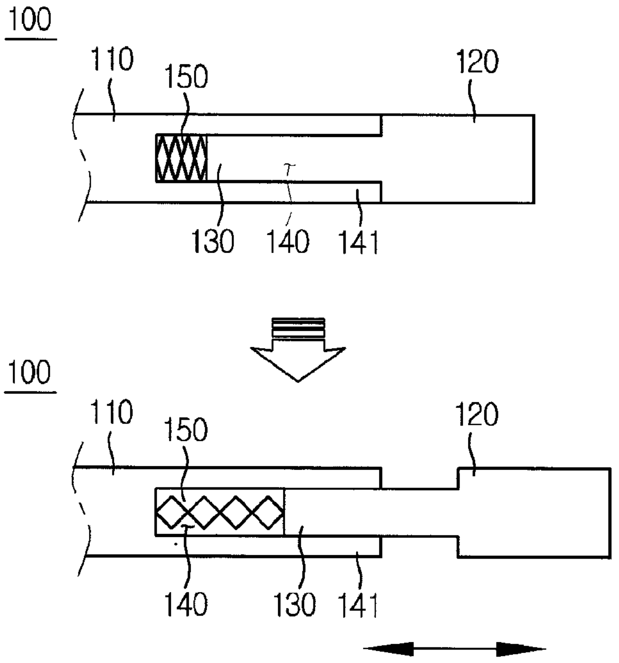

Meanwhile, the door further includes a pad 160 to support the movement of the slider 120 and thereby perform the impact absorption function, the soundproof function, and the insulation function of the door 100, as shown in FIG. 5. This will be described with reference to the drawing.

FIG. 5 is a plan view showing the door to illustrate the pad according to the preferred embodiment of the present invention.

FIG. 5A is a plan view showing the door 100 when taking the configuration of FIG. 3, and FIG. 5B is a plan view showing the door 100 when taking the configuration of FIG. 4.

As shown in the drawing, the pad 160 is a resilient member that is installed between the protrusion 130 and the guide groove 140, thus preventing impulsive noise and damage resulting from the reduction of the door 100, in addition to achieving soundproof effect and insulation effect.

That is, the pad is installed between the end of the protrusion 130 and the inner surface of the guide groove 140 facing it, thus supporting the movement of the slider 120. As a result, when the width of the door 100 is reduced at high speed, the pad 160 can absorb the impacts.

Further, the door 100 is configured such that the rotary body 110 and the slider 120 are separated from each other. Such a configuration may be inferior to the conventional integrated door in terms of soundproof effect, insulation effect and side strength.

Thus, the pad 160 is further installed between the protrusion 130 and the guide groove 140, thus overcoming the disadvantage of the separated structure, ensuring safety, and preventing the function from being deteriorated as compared to the conventional door.

Figure 6:
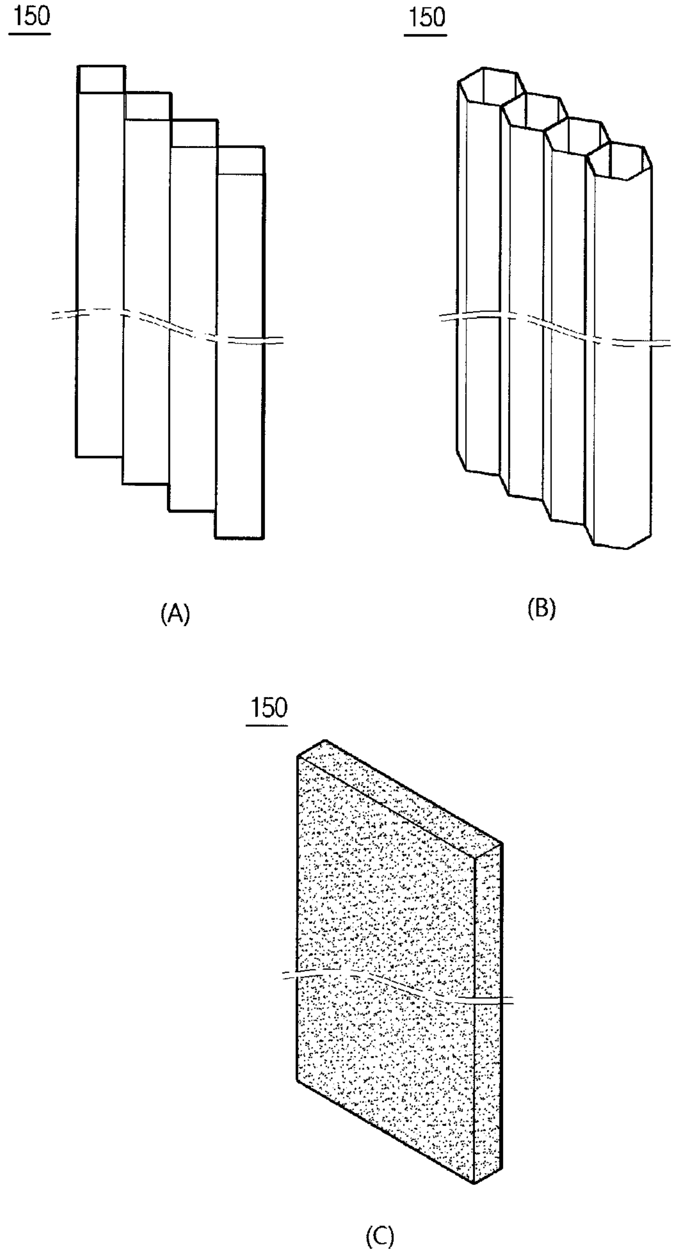
FIG. 6 is a perspective view illustrating an example of a pad according to the preferred embodiment of the present invention.

As shown in the drawing, such a pad 160 is the resilient member. It preferably has a shape where ridges and furrows are continuously formed in a longitudinal direction, and more preferably has a diamond shape. Further, as shown in FIG. 6, it is possible to optionally apply at least one of a shape a where diamonds are continuously formed, a shape b where hexagons are continuously formed, and a resilient member such as sponge c.

Figure 7:
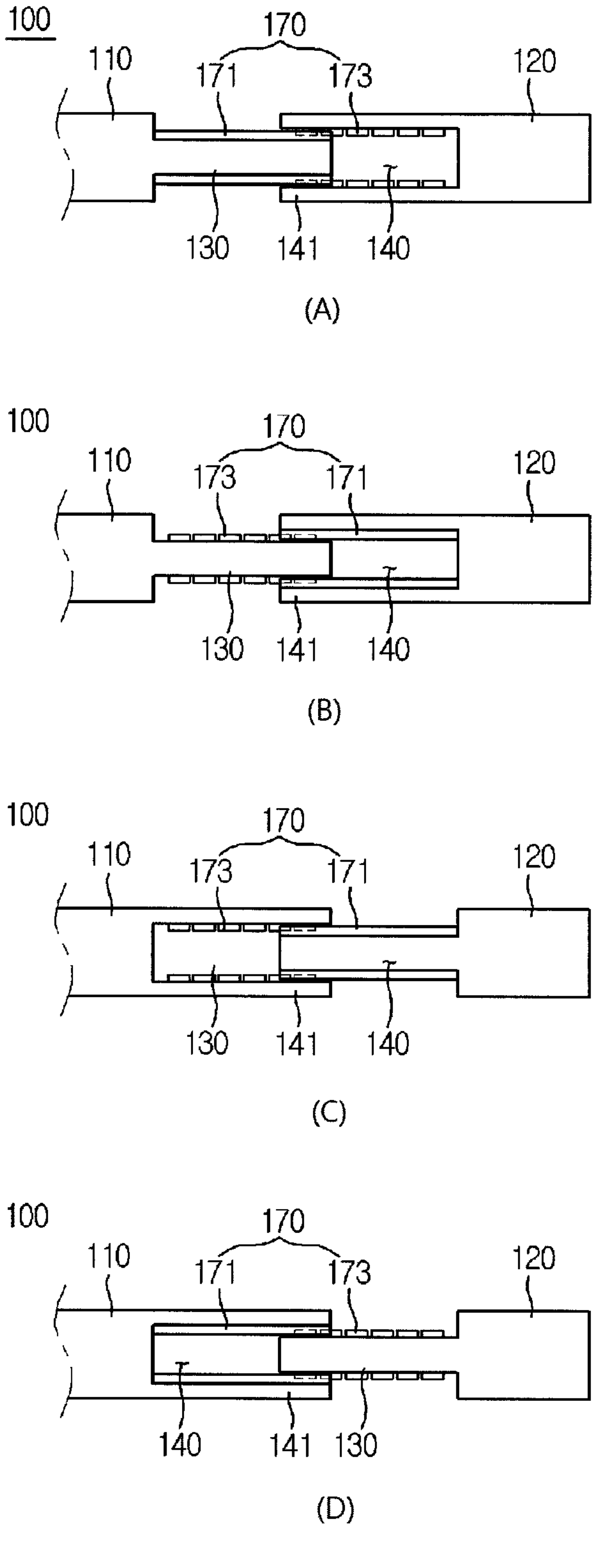
FIG. 7 is a plan view illustrating a guide portion according to the preferred embodiment of the present invention.

Meanwhile, for the purpose of the smooth movement of the slider 120, as shown in FIG. 7, a guide portion 170 may be further installed. This will be described with reference to the drawing.

FIG. 7 is a plan view illustrating the guide portion according to the preferred embodiment of the present invention.

As shown in the drawing, the guide portion 170 is further provided to minimize the movement of the slider 120, namely, the friction between the protrusion 130 and the guide groove 140 and thereby to guide the smooth movement of the slider 120.

Such a guide portion 170 is configured as follows: a plurality of rollers 173 is provided at regular intervals on either of the protrusion 130 or the guide groove 140, and a guide rail 171, on which the rollers are supported or which is supported by the rollers, is provided on the remaining one. The detailed description thereof will be provided with reference to respective mounting examples.

First, FIGS. 7A and 7B are partial plan views of the door 100 when taking the configuration of FIG. 3, and FIGS. 7C and 7D are partial plan views of the door 100 when taking the configuration of FIG. 4.

In FIG. 7A, the guide rail 171 is provided on the protrusion 130 extending from the rotary body 110, and a plurality of rollers 173 is installed at regular intervals at the guide groove 140 provided in the slider 120.

FIG. 7B is a view corresponding to FIG. 7A. Here, the plurality of rollers 173 is installed at regular intervals at the protrusion 130 extending from the rotary body 110, and the guide rail 171 is installed in the slider 120.

In FIG. 7C, the plurality of rollers 173 is installed at regular intervals at the guide groove 140 provided in the rotary body 110, and the guide rail 171 is installed at the protrusion 130 extending from the slider 120.

FIG. 7D is a view corresponding to FIG. 7C. Here, the guide rail 171 is installed in the guide groove 140 provided in the rotary body 110, and the plurality of rollers 173 is installed at regular intervals on the protrusion 130 extending from the slider 120.

As such, the guide portion 170 is installed in various configurations, thus minimizing friction between the protrusion 130 and the guide groove 140 and thereby allowing the slider 120 to be smoothly moved.

Further, in the guide portion 170, the plurality of rollers 173 is modularized, thus enabling the easy installation. This will be described with reference to FIG. 8.

Figure 8:
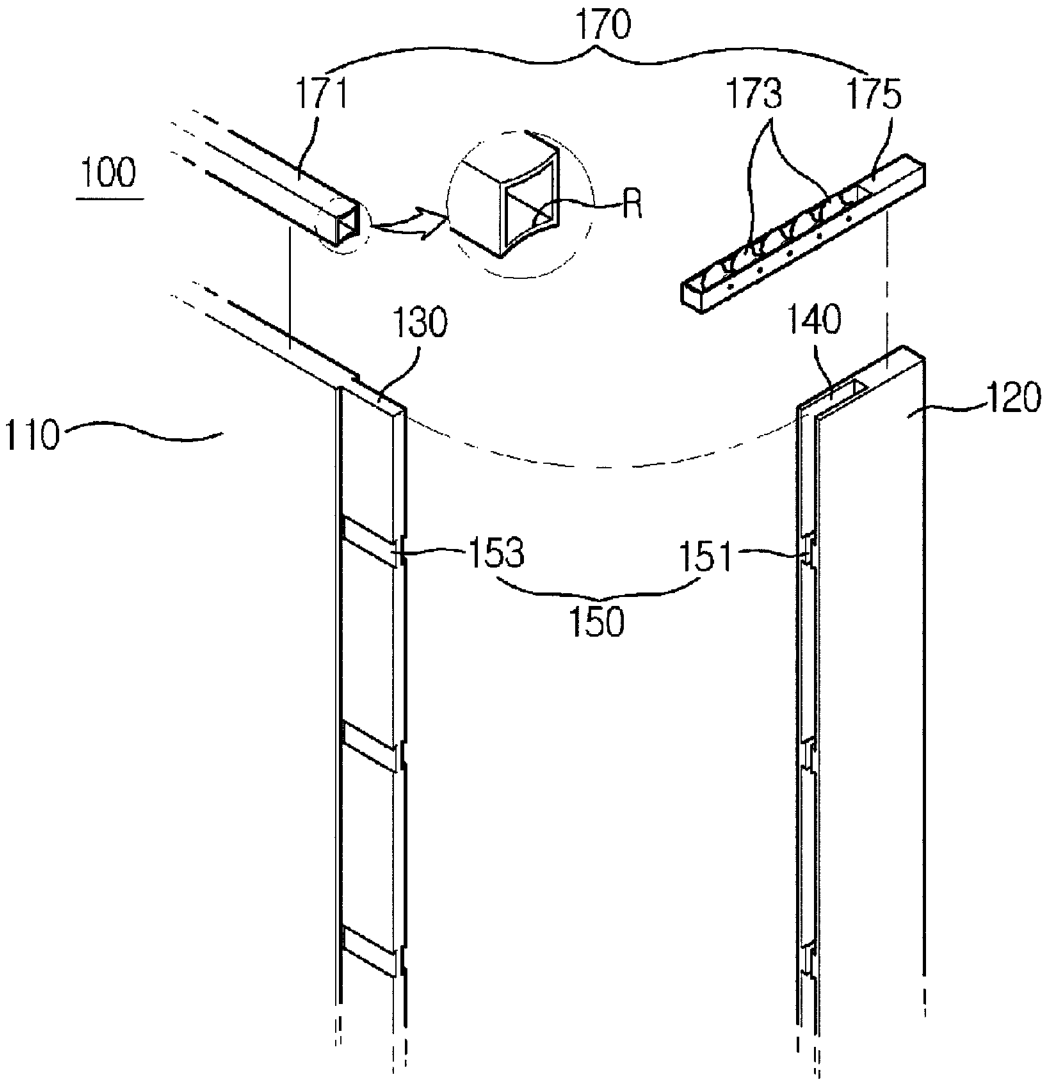
FIG. 8 is an exploded view illustrating the guide portion according to the preferred embodiment of the present invention.

FIG. 8 is an exploded view illustrating the guide portion according to the preferred embodiment of the present invention.

As shown in the drawing, the guide portion 170 includes the guide rail 171 and a roller frame 175 receiving the plurality of rollers 173, so that they may be mounted on the tops of the rotary body 110 and the slider 120. Although not shown in the drawing, the guide portion may also be installed with the protrusion 130 and the guide groove 140.

The guide rail 171 is a casing that is open on at least one surface thereof, and receives the roller frame 175 via the open surface. Here, the surface of the guide rail contacting the roller 173 preferably has the shape of a curved surface R corresponding to the surface of the roller 173.

As shown in the drawing, the roller frame 175 is a module wherein the plurality of rollers 173 is installed at regular intervals. The plurality of rollers 173 is modularized, thus allowing the installation to be more easily implemented.

Of course, the guide portion 170 may be installed as shown in the drawing, and besides may be installed in various manners as in the mounting examples of FIG. 7 although the installing manners are not shown in the drawing. Preferably, the installation of the guide portion is not limited to the configuration shown in the drawing.

Figure 9:
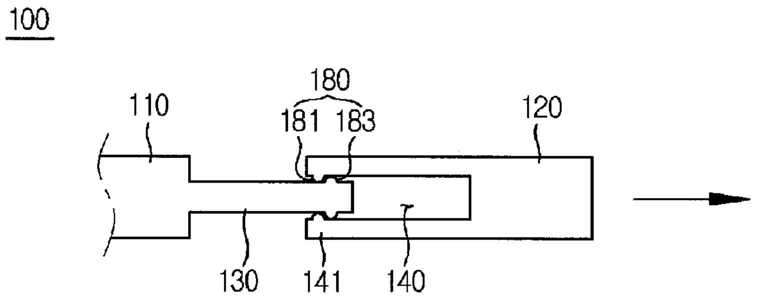
FIG. 9 is a plan view showing the door to illustrate a stopper according to the preferred embodiment of the present invention.
Figure 9:
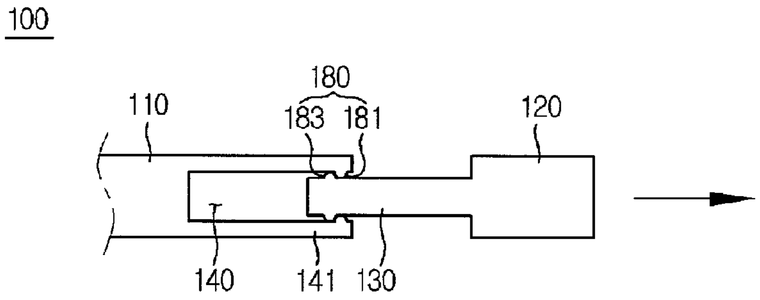
Figure 11:
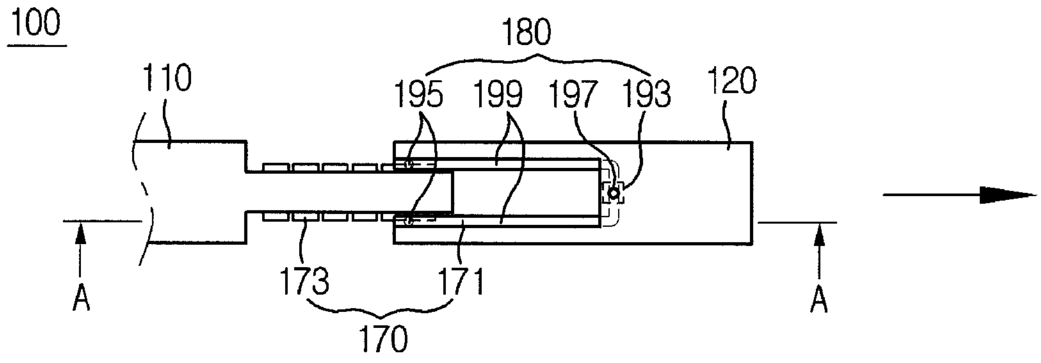
FIG. 11 is a plan view showing the door to illustrate another example of a stopper according to the preferred embodiment of the present invention.

Meanwhile, the position of the moving slider 120 is fixed by the stopper 180 as shown in FIGS. 9 to 11. The stopper may prevent the slider from being removed from the rotary body 110, which will be described with reference to the respective drawings.

FIG. 9 is a plan view showing the door to illustrate the stopper according to the preferred embodiment of the present invention.

As show in the drawing, one or more stoppers 180 are provided on the respective facing surfaces of the protrusion 130 and the guide groove 140.

The stopper 180 includes a locking step 181 provided on any one guide groove 14, and a locking projection 183 provided on the protrusion 130, thus preventing the slider 120 from being removed from the rotary body 110 when the slider moves relative thereto.

That is, the locking step 181 makes contact with the locking projection 183, thus preventing the removal of the slider 120.

Meanwhile, the guide groove 140 and the protrusion 130 may be formed as shown in FIG. 9A when taking the configuration of FIG. 3 or optionally as shown in FIG. 9B when taking the configuration of FIG. 4.

Further, the locking step 181 and the locking projection 183 preferably have a curved or hemispherical shape, as shown in the drawing. However, without being limited thereto, at least any one of a rectangle, a polygon, a triangle and an asymmetric polygon as well as the curved shape is very preferable. Here, the locking step 181 and the locking projection 183 may have different shapes.

Meanwhile, it is possible to adjust the position of the slider 120 in stages via the stopper 180, which will be described with reference to FIG. 10.

FIG. 10 is a plan view showing the door to illustrate an example of a stopper according to the preferred embodiment of the present invention.

The drawing shows the stopper 180 that is configured to reduce the width of the door 100 in stages. Such a stopper 180 includes a plurality of seating grooves 185 that are formed at regular intervals in either of the protrusion 130 or the guide groove 140, and an elastic ball 187 that is provided on a remaining one. The detailed description thereof will be provided with reference to respective mounting examples.

First, FIGS. 10A and 10B are partial plan views of the door 100 when taking the configuration of FIG. 3, and FIGS. 10C and 10D are partial plan views of the door 100 when taking the configuration of FIG. 4.

In FIG. 10A, the stopper 180 includes a seating groove 185 that is formed in the protrusion 130 extending from the rotary body 110, and an elastic ball 187 that is installed in the slider 120 to be elastically supported by the seating groove 185.

The seating groove 185 is a hemispherical groove. A plurality of seating grooves is formed at predetermined intervals on at least one surface of the protrusion 130. As shown in the drawing, the elastic ball 187 is composed of an elastic body 191 mounted to a surface of the guide groove 140 and a ball 189 supported by the elastic body 191.

Such an elastic ball 187 is configured such that the elastic body 191 supports the ball 189. The support principle is as follows: when a pressure acting on the ball 189 exceeds a predetermined level, the elastic body 191 is compressed, whereas when the pressure is released, the elastic body 191 is restored to its original state.

That is, when the end of the ball 189 makes contact with the protrusion 130, the elastic body 191 is compressed. At this time, the ball 189 is compressed in proportion to a depth where the elastic body 191 is compressed, so that the exposure of the ball to the outside is minimized.

Further, if the end of the ball 189 is located in the seating groove 185, the ball 189 is elastically seated in the seating groove 185 by the restoring force of the elastic body 191, thus holding the slider 120 in place.

Thus, a user can adjust the position of the slider 120 or reduce or increase the width of the door 100 in stages using the plurality of seating grooves 185.

FIG. 10B shows that the elastic ball 187 is provided on the protrusion 130 extending from the rotary body, and the guide groove 140 is formed in the slider 120 corresponding thereto. Since a configuration and an operation have been described in detail with reference to FIG. 10A, a detailed description thereof will be omitted herein.

FIG. 10C shows that the elastic ball 187 is installed in the guide groove 140 provided in the rotary body 110, and the plurality of seating grooves 185 is formed at regular intervals in the protrusion 130 extending from the slider 120 corresponding thereto.

FIG. 10D shows that the plurality of seating grooves 185 is formed at regular intervals in the guide groove 140 provided in the rotary body 110, and the elastic ball 189 is installed in the protrusion 130 extending from the slider 120.

Although not shown in the drawing, the stopper 180 is preferably installed along with the guide portion 170 as well as the fastening portion 150 shown in FIGS. 1 to 9. The stopper 180 may be installed to be operated in conjunction with the guide portion 170. One example will be described with reference to FIG. 11.

FIG. 11 is a plan view showing the door to illustrate another example of a stopper according to the preferred embodiment of the present invention.

First, since the position of the protrusion 130 and the guide groove 140 and the symmetric structure of the stopper 180 may be variously applied as shown in FIGS. 9 and 10, the stopper 180 will be described with reference to FIG. 7A in order to avoid a redundant description.

As shown in the drawing, the stopper 180 is operated in conjunction with the guide portion 170, thus adjusting the width of the door 100 in stages.

Such a stopper 180 includes a locking hook 195 provided on one end of a rod 199, a pressing piece 197 provided on the other end of the rod, and an elastic body 193 interposed between the locking hook 195 and the pressing piece 197. The respective configurations will be described with reference to FIGS. 12 to 14 that show the operational state of the stopper 180.

As shown in the drawing, the locking hook 195 is provided on one end of the rod 199, with one surface thereof being vertical and the other surface being curved.

Figure 12:
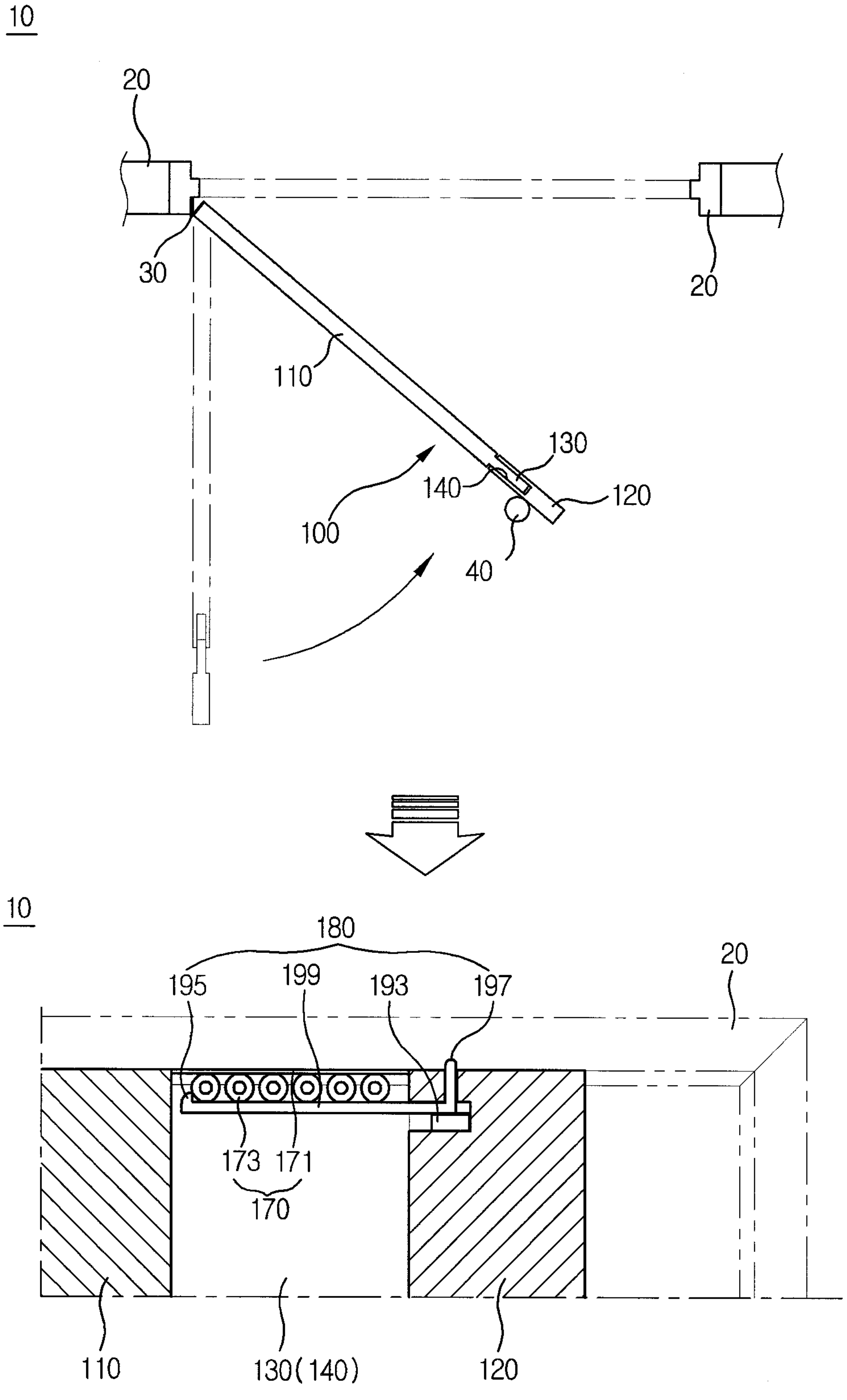
FIGS. 12 to 14 illustrate an operating state of the stopper of FIG. 11 in plan views and sectional views.

This imparts directivity to the locking hook 195, so that the movement of the locking hook 195 to its vertical surface, that is, the movement to the right side of FIG. 12 is restricted by the roller 173. In contrast, the left side of the locking hook is curved, so that its smooth movement is possible.

Figure 13:
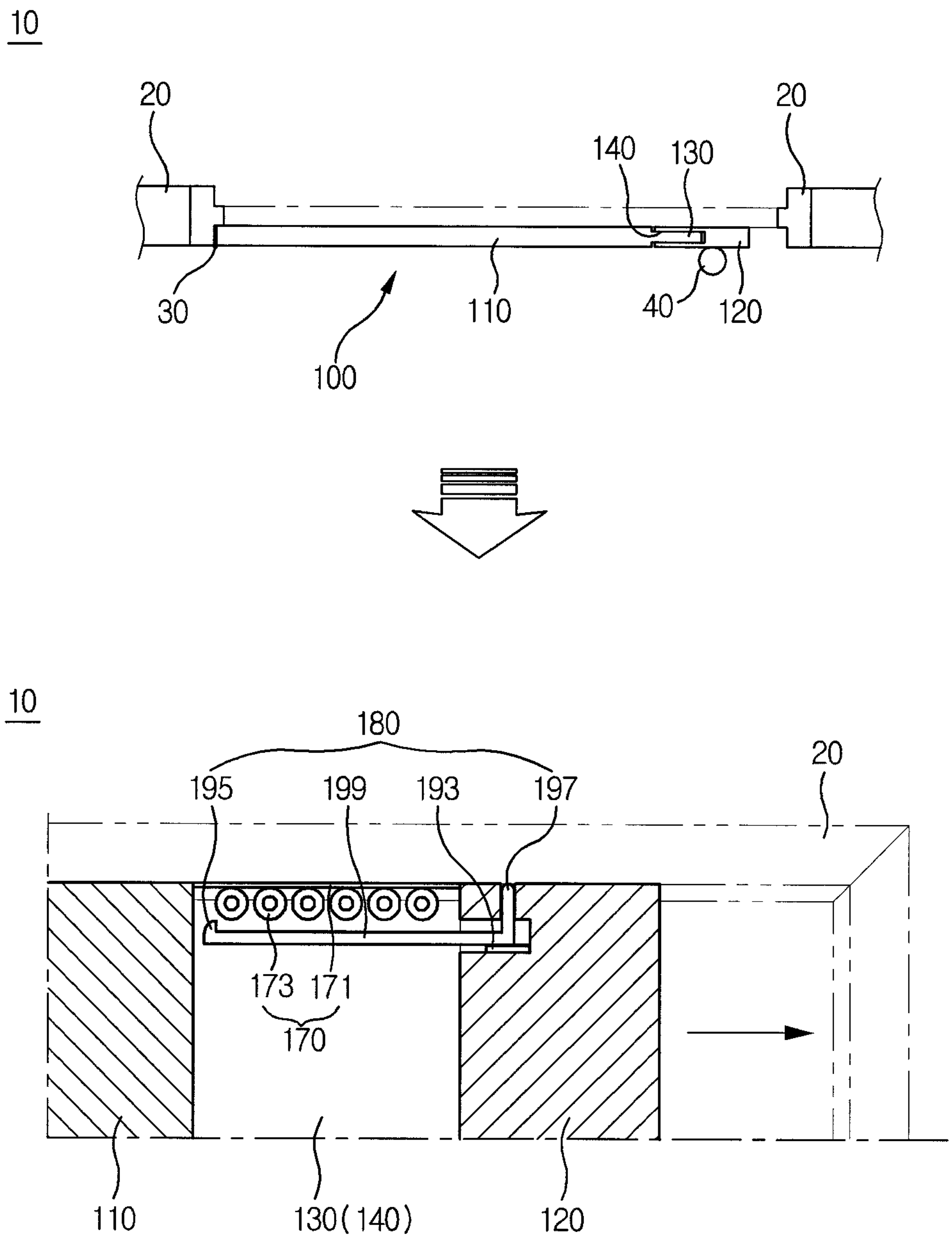

The pressing piece 197 protrudes by a predetermined length to the outside of the slider 120 having the guide groove 140 formed therein. When the door 100 is closed, it is pressed downwards by the door frame 20 as shown in FIG. 13. Thus, the rod 199 and the locking hook 195 are moved downwards together, the locking hook 195 is separated from the roller 173. Consequently, the slider 120 assumes a state where it is ready to move.

The elastic body 193 is provided on a bottom surface of the rod 199 having the pressing piece 197, thus elastically supporting the stopper 180. Therefore, as shown in FIG. 12, the locking hook 195 is supported by the roller 173 to limit the movement of the slider 120.

Accordingly, when the door 100 is open as shown in FIG. 12, the locking hook 195 is supported by the roller 173 as shown in the drawing, thus limiting the movement of the slider 120.

Here, if the door 100 is closed by wind pressure or by mistake, as shown in FIG. 13, the door 100 is separated from the door frame 20, thus preventing an accident from occurring in an unexpected situation.

Further, after the door 100 is closed, the pressing piece 197 is pressed against the door frame 20, so that the locking hook 195 supported by the roller 173, namely, the stopper 180 is released.

Figure 14:
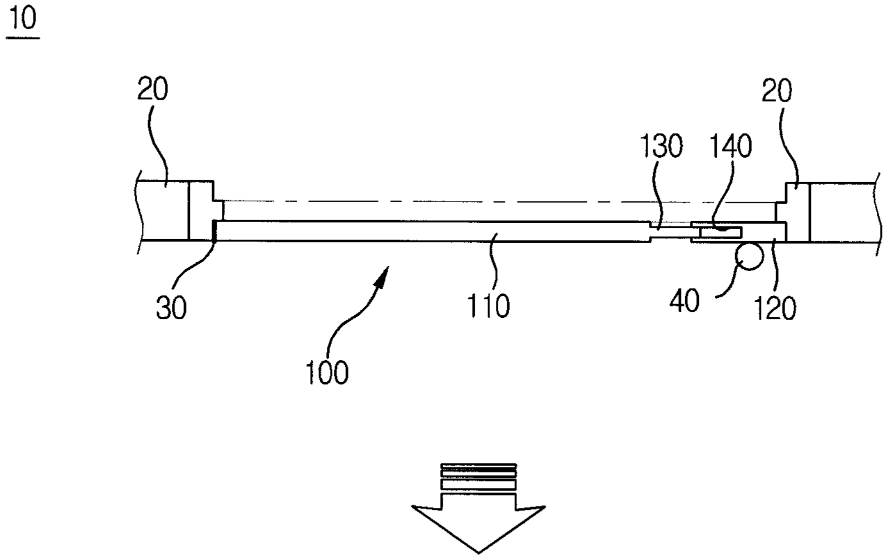
Figure 14:
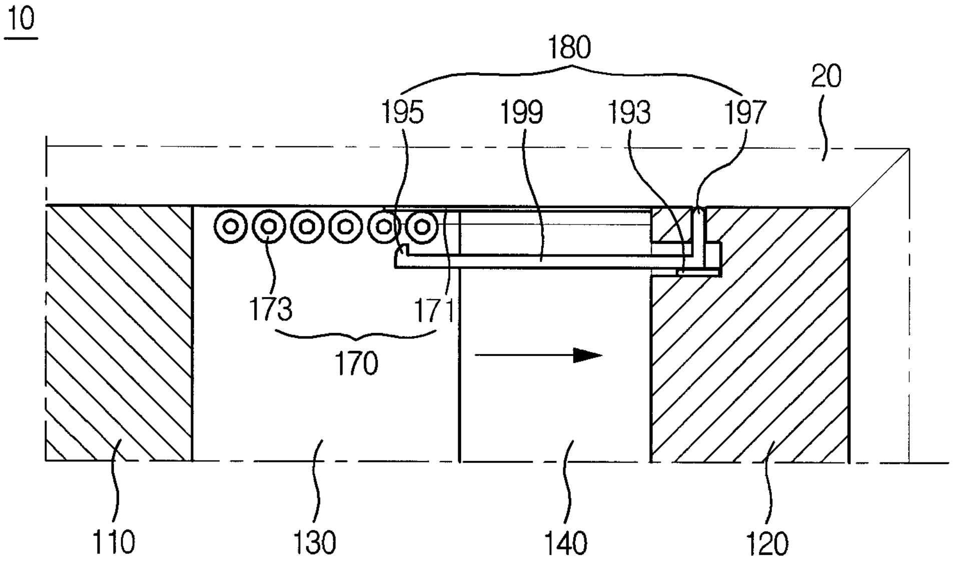

As the stopper 180 is released, the slider 120 maintains the movable state. Here, as necessary, the door 100 may be opened again or the slider 120 may be moved rightwards as shown in FIG. 14 to close a space between the door frame 20 and the door 100.

Figure 15:
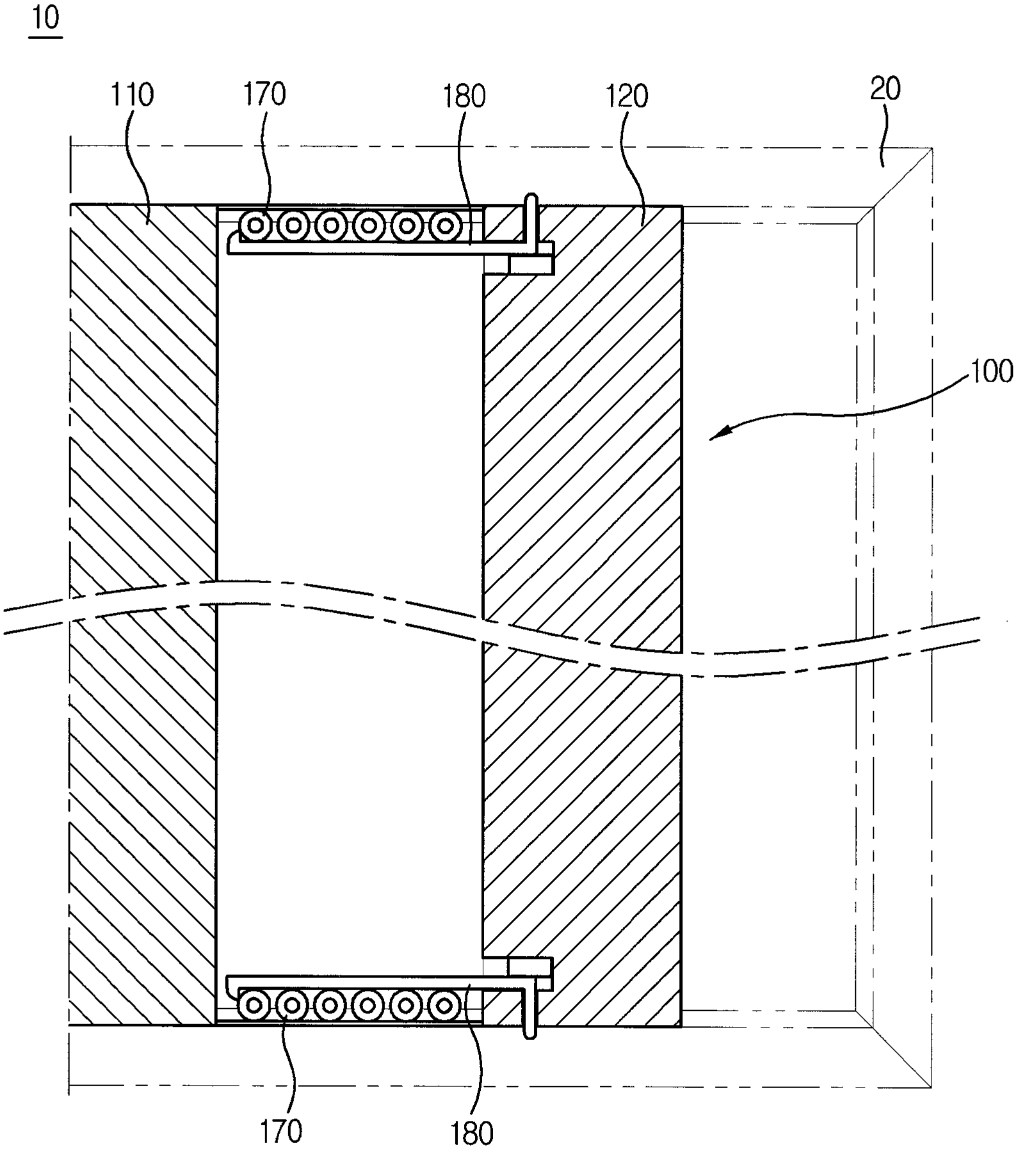
FIG. 15 is a sectional view illustrating a mounting example of the stopper according to the preferred embodiment of the present invention.

Meanwhile, the stopper 180 described with reference to FIGS. 9 to 11 may be installed only at the upper portion of the door 100, or installed at each of the upper and lower portions of the door 100, as shown in FIG. 15. This is preferably applied in view of safety for a site.

Further, if the stoppers 180 are provided, respectively, on the upper and lower portions of the door, they allow the width of the door 100 to be more easily extended. In addition, if one of the stoppers is too much used or is defective, the other compensates for the defective stopper to smoothly adjust the width of the door 100 and thereby prevent an accident in advance.

Figure 16:
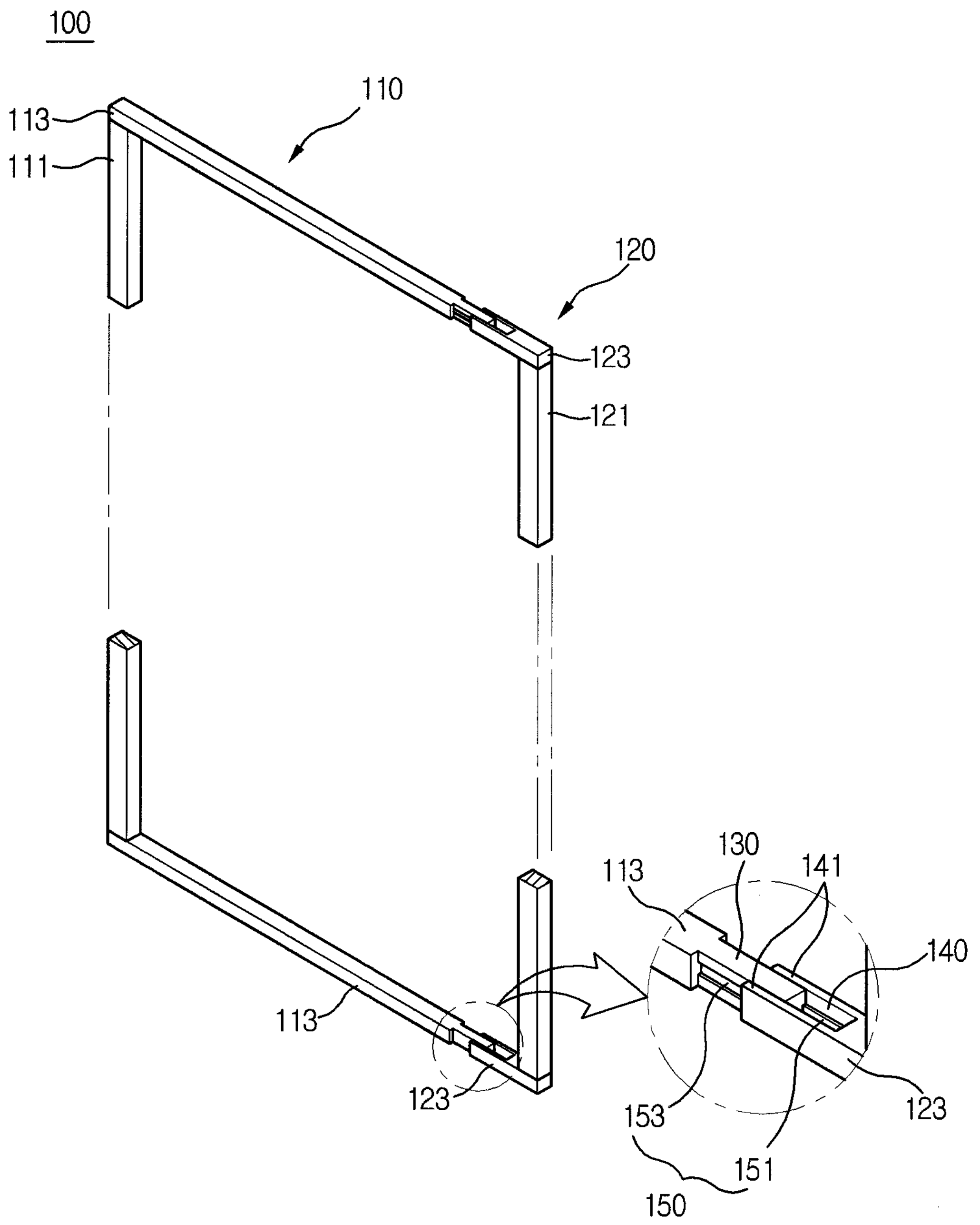
FIG. 16 is a perspective view illustrating a door according to the preferred embodiment of the present invention.
Figure 17:
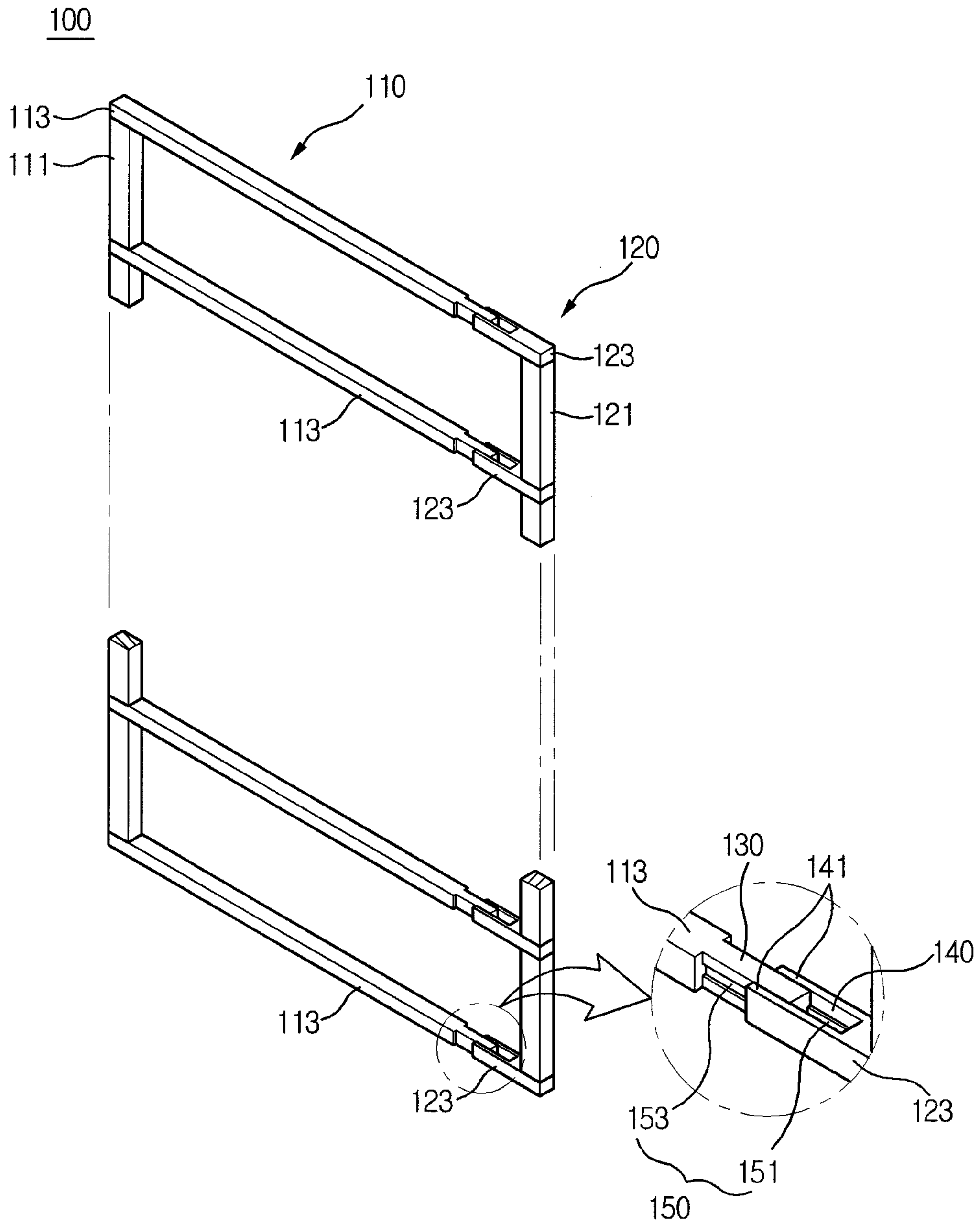
FIG. 17 is a perspective view illustrating a door according to the preferred embodiment of the present invention.

Meanwhile, the door is not limited to a solid shape as shown in FIGS. 1 to 15, but may have a frame structure as shown in FIGS. 16 and 17, which will be described with reference to the drawings.

FIG. 16 is a perspective view illustrating a door according to the preferred embodiment of the present invention.

As shown in the drawing, the door 100 has the frame structure, and includes a rotary body 110 composed of a first vertical frame 111 and a first horizontal frame 113 provided on each of upper and lower portions of the first vertical frame, and a slider 120 composed of a second vertical frame 121 and a second horizontal frame provided on each of upper and lower portions of the second vertical frame. Here, a protrusion 130 is provided on either of the first horizontal frame 113 or the second horizontal frame 123, while a guide groove 140 is formed in a remaining one.

Further, each of the first and second horizontal frames 113 and 123 may comprise one or more frames between the upper and lower portions of the door 100 as shown in FIG. 17. The protrusion 130 and the guide groove 140 adopt the fastening portion 150 of a male-female structure. Moreover, although not shown in the drawing, it is preferable that the guide portion 170 be further installed to enable the smooth movement of the slider 120.

Although the door 100 of the frame structure is not shown in the drawing, the inner space of the frame is preferably closed. This is more preferably closed by a thin panel of wood, glass or metal.

The thin panel closes each of opposite surfaces of the frame, namely, a pair of panels closes front and rear surfaces of the frame, respectively. Alternatively, an open space such as the front surface, the rear surface, a gap between the front and rear surfaces may be closed using one panel.

Figure 18:
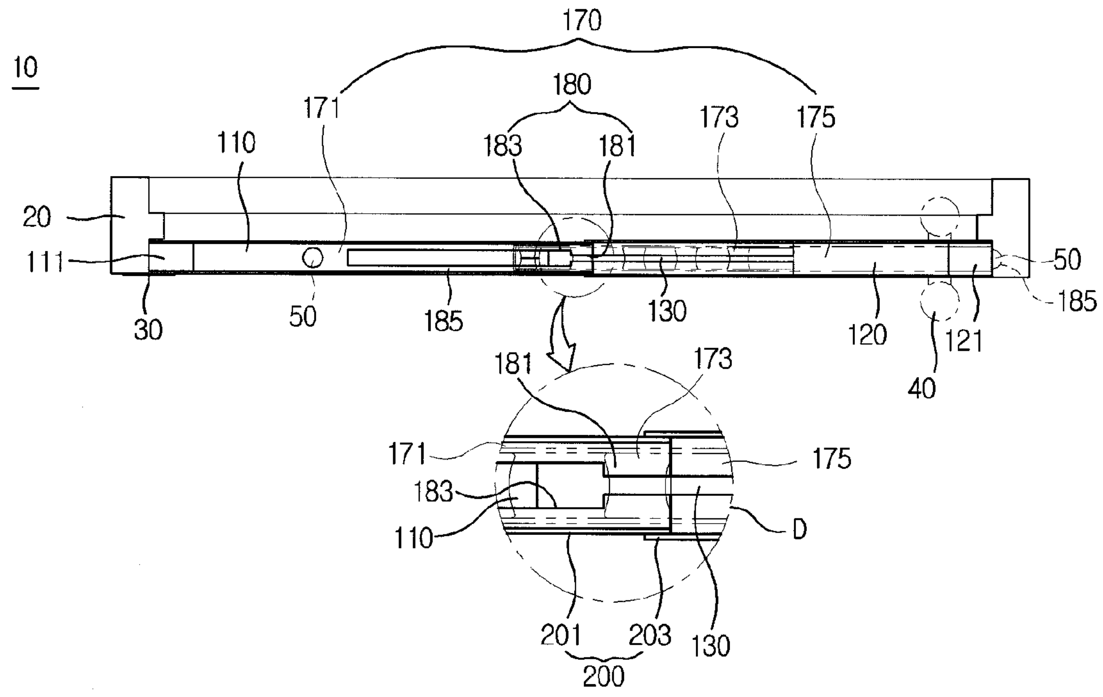
FIG. 18 illustrates a safety door according to another preferred embodiment of the present invention in a plan view and a front view.
Figure 18:
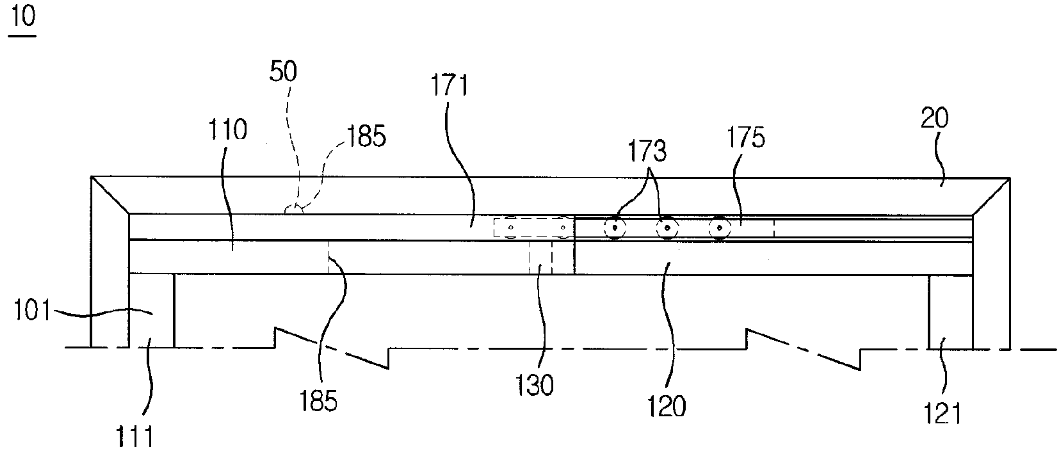

FIG. 18 illustrates a safety door according to another preferred embodiment of the present invention in a plan view and a front view.

As shown in FIGS. 18A and 18B, the door further includes a pair of vertical frames 111 and 121 to reinforce the door 100 of the hinged door 10, and at least a pair of guide portions 170. Here, the rotary body 110 and the slider 120 take a male-female slide coupling structure as shown in FIGS. 1 to 17.

Further, the stopper 180 is provided on each of the ends of the rotary body 110 and the slider 120 in order to prevent the slider 120 from being removed from the rotary body 110.

Such a stopper 180 includes a locking step 181 that is provided on the end of the guide groove 185 of the rotary body 110 in such a way as to protrude inwards to a predetermined length, and a locking projection 183 that is provided on the end of the protrusion 130 of the slider 120. Hence, when the slider 120 is extended, the locking projection 183 comes into contact with the locking step 181, thus limiting the extension of the slider 120 and thereby preventing the slider 120 from being removed from the rotary body 110.

As shown in the drawing, the vertical frame has the shape of a vertical bar, and includes a first frame 111 that faces a left vertical surface of the door frame 20 and is coupled to the rotary body 110, and a second frame 121 that faces a right vertical surface of the door frame 20 and is coupled to the slider 120. Here, the first frame 111 is joined the door frame 20 via the hinge 30 in such a way as to be rotatable about the hinge 30.

Further, the guide portion 170 is installed to be parallel to the rotary body 110 and the slider 120, thus guiding the slider 120 so that it is smoothly moved leftwards and rightwards.

Such a guide portion 170 includes a tubular guide rail 171 that is coupled to the rotary body 110, and a roller portion 175 that comprises a plurality of guide rollers 173 arranged continuously and slidably moves into the guide rail 171. Preferably, the guide portion 170 is installed at each of the upper and lower portions of the door 100 facing the door frame 20.

Meanwhile, the fixing member 50 is further provided on at least a surface of the door 100 and serves to fix the door 100 to the door frame 20 to keep the door 100 closed when it is closed.

The fixing member 50 utilizes elasticity. Since its configuration is the same as the elastic ball 187 and the seating groove

185 according to the embodiment of the present invention, its configuration will not be described herein.

When the door 100 is closed, the fixing member 50 mounted to the door 100 is elastically seated in the seating groove 185 provided in the door frame 20, thus fixing the door 100 to a predetermined position. The fixing member 50 is preferably provided on any one of the upper surface and the side surface of the door 100. However, when the door 100 is closed with the width of the door 100 being reduced, there does not occur friction between the side surface of the door frame 20 and the second frame 121. Thus, the fixing member is provided on at least the upper surface of the door 100, and is very preferably provided on a surface of the guide rail 171 facing the door frame 20.

However, preferably, the fixing member 50 is not limited to the above-mentioned position, but may be installed at various positions, for example, one or more positions of the guide rail 171, the roller portion 175 and a surface of the second frame 121.

Meanwhile, the rotary body 110 and the slider 120 may be optionally installed at the door 100, which will be described with reference to the drawing.

Figure 19:
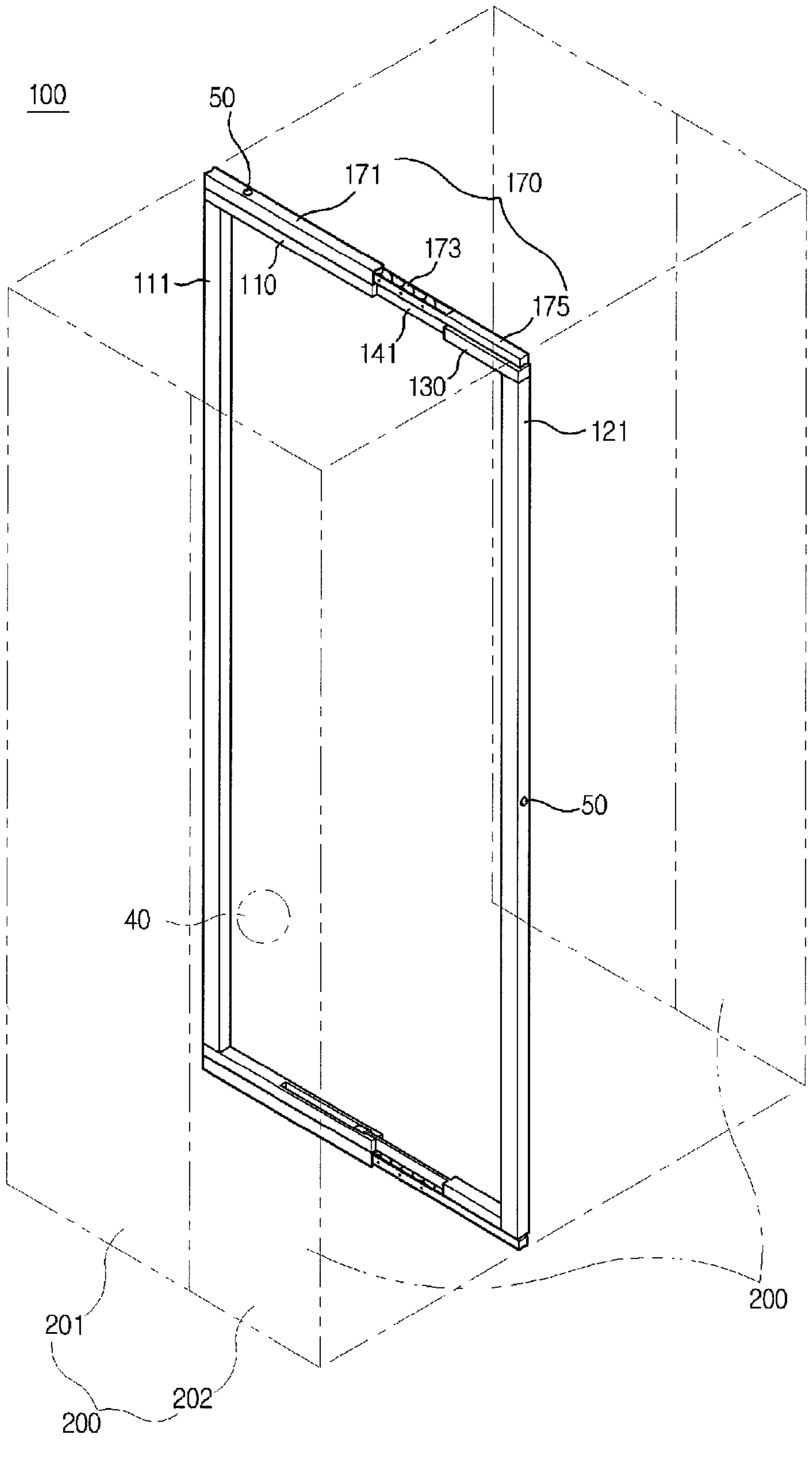
FIGS. 19 to 21 are perspective views illustrating an example of a safety door according to another preferred embodiment of the present invention.
Figure 20:
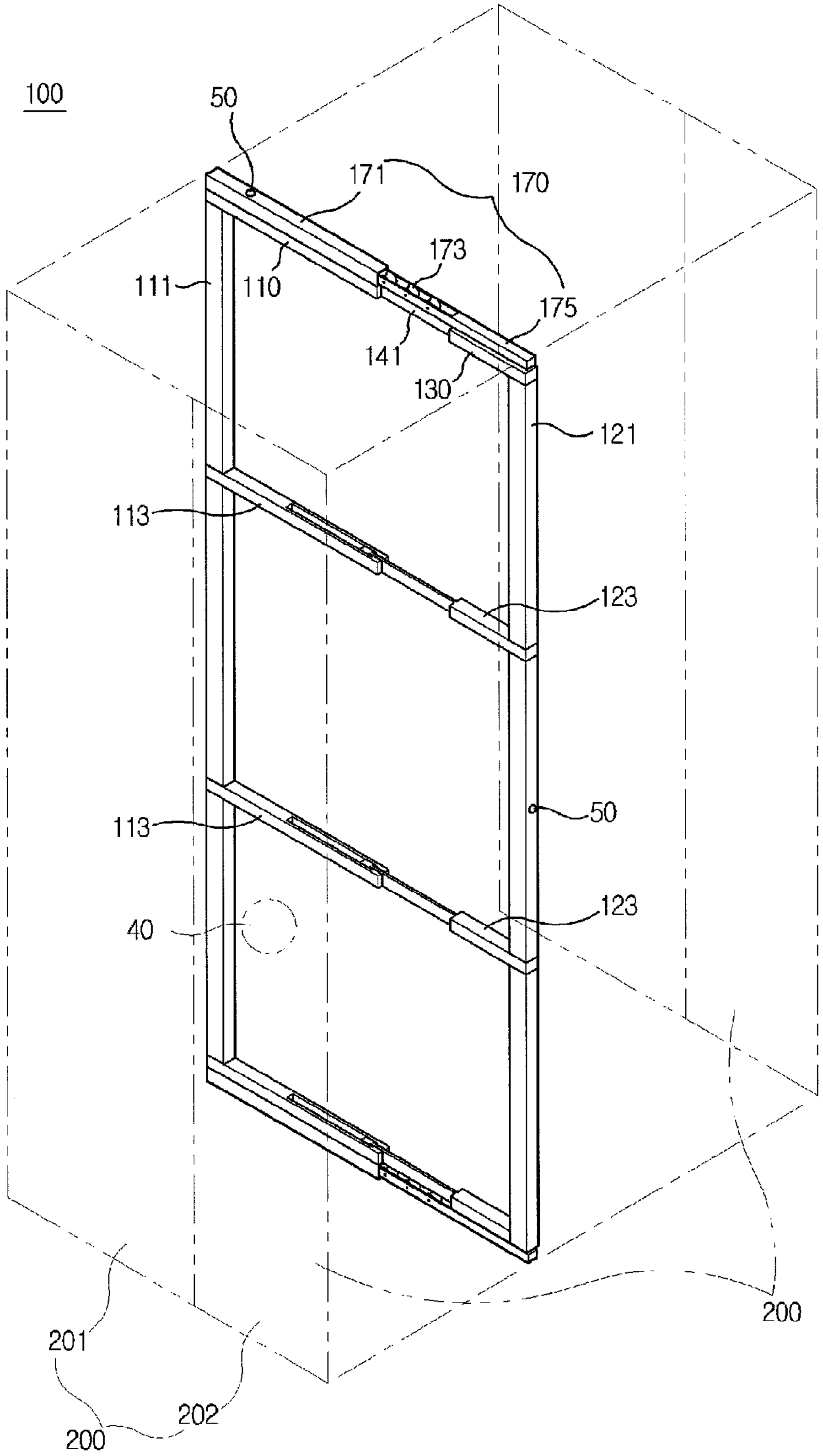
Figure 21:
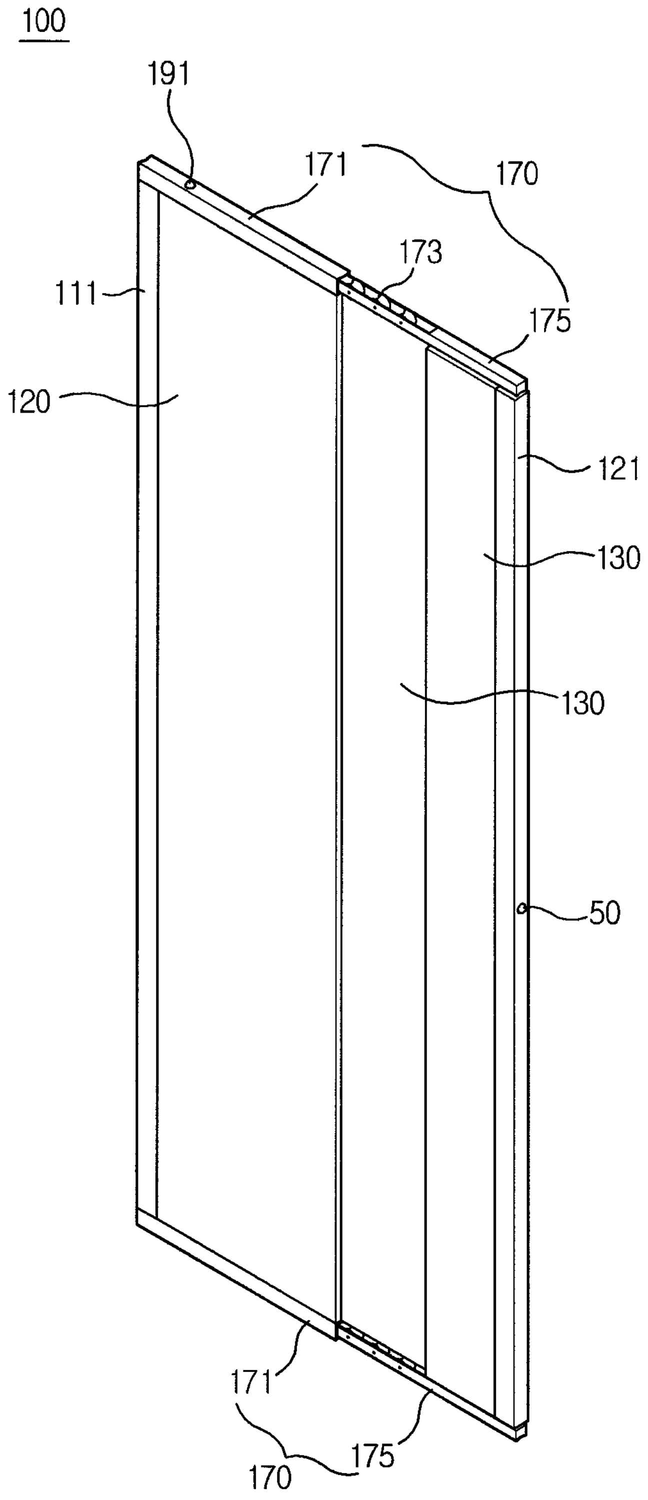

FIGS. 19 to 21 are perspective views illustrating an example of a safety door according to another preferred embodiment of the present invention.

As shown in the drawings, the position and the number of the rotary body 110 and the slider 120 may be selectively provided between a pair of vertical frames 111 and 121.

That is, they may be installed at both ends in a longitudinal direction of the vertical frame 111 as shown in FIG. 19, or they may be installed at both ends in the longitudinal direction of the vertical frame 111 and predetermined positions between the ends as shown in FIG. 20. Further, instead of the coupling form of the horizontal bar, the rotary body 110 and the slider 120 may be extended vertically to have the same length as the vertical frame 111.

The door of FIGS. 19 and 20 has the structure using the vertical frame 111. That is, for the purpose of the lightness of the door 100, a surface defined by the vertical frame 111 is open and a thin panel 200 is used to close the open surface.

That is, the panel 200 is attached to each of open front and rear surfaces of the door 100. Here, two panels 201 and 203 are attached to each of the front and rear surfaces. The panels are attached to the rotary body 110 and the slider 120, respectively, when the door 100 is a slidable structure. That is, when viewing portion "D" of FIG. 18, it can be seen that the panels 200 are attached to the rotary body 110 and the slider 120, respectively.

Further, the panels 200 are attached in such a way that they overlap each other by a predetermined width. The reason is because the width of the rotary body 110 is manufactured to be less than that of the slider 120 and a second panel 203 attached to the slider 120 is movable to the outside of a first panel 201 attached to the rotary body 110.

Meanwhile, referring to FIG. 20, there is no open area between the vertical frames. Thus, the panel 200 is optionally attached by a manufacturer's intention or a user. Further, although not shown in the drawings, the vertical frame 111 for reinforcing the door 100 may be dispensed with.

Although the embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A safety door having a rotary body hinged to a door frame, and a slider overlapping with an end of the rotary body and coupled thereto in such a way as to move along the rotary body, the safety door comprising:

a fastening portion provided on at least one surface of an overlapping region of the rotary body and the slider, thus preventing separation and deformation of the overlapping region and guiding a movement of the slider; and a stopper preventing the slider from being removed from the rotary body, and fixing or restricting a position of the slider, wherein the rotary body and the slider decrease a width of a door by an overlapping movement of a female guide groove and a male protrusion, the safety door further comprising:

a resilient pad provided between the protrusion and the guide groove, and supporting an impact generated by a reduction in the width of the door.

2. The safety door according to claim 1, wherein the pad is made of any one of paper, polymer, and sponge.

3. The safety door according to claim 2, wherein the door further comprises:

a fixing member elastically provided on at least either of the rotor and the slider contacting the door frame to facilitate an elastic opening or closing operation from the door frame.

4. The safety door according to claim 1, wherein the pad has a resilient diamond shape or hexagonal honeycomb shape by symmetrically connecting at least one elastic member, with ridges and furrows of the elastic member continuously formed in a moving direction of the slider.

5. The safety door according to claim 4, wherein the door further comprises:

a fixing member elastically provided on at least either of the rotor and the slider contacting the door frame to facilitate an elastic opening or closing operation from the door frame.

6. The safety door according to claim 1, wherein the fastening portion comprises:

at least fastening projection provided on either of at least one surface of the protrusion and a cover of the guide groove contacting the surface in such a way as to be spaced apart from each other by a predetermined interval in a vertical direction; and a fastening groove provided on a remaining one to slidably engage with the fastening projection in the horizontal direction.

7. The safety door according to claim 6, wherein the door further comprises:

a fixing member elastically provided on at least either of the rotor and the slider contacting the door frame to facilitate an elastic opening or closing operation from the door frame.

8. The safety door according to claim 1, further comprising:

a plurality of rollers provided on a surface of the protrusion or the guide groove; and a rail supporting the rollers, or provided on a corresponding surface, having the rollers, to support the rollers.

9. The safety door according to claim 8, wherein the stopper comprises:

at least one seating groove formed in at least one surface of the protrusion or the guide groove; and an elastic ball formed on a corresponding surface that faces the seating groove.

10. The safety door according to claim 9, wherein the door further comprises:

a fixing member elastically provided on at least either of the rotor and the slider contacting the door frame to facilitate an elastic opening or closing operation from the door frame.

11. The safety door according to claim 8, wherein the stopper comprises:

at least one seating groove formed in at least one surface of the protrusion or the guide groove; and an elastic ball formed on a corresponding surface that faces the seating groove.

12. The safety door according to claim 11, wherein the door further comprises:

a fixing member elastically provided on at least either of the rotor and the slider contacting the door frame to facilitate an elastic opening or closing operation from the door frame.

13. The safety door according to claim 8, wherein the stopper is provided on the rotary body or the slider equipped with the rail, and comprises:

a locking hook provided on one end thereof and supported by an outside of any one of the plurality of rollers;

a pressing piece provided on the other end and protruding outwards by a predetermined length from a surface at which the stopper is installed, thus being pressed against the door frame when the door is closed; and an elastic body provided between the locking hook and the pressing piece.

14. The safety door according to claim 13, wherein the door further comprises:

a fixing member elastically provided on at least either of the rotor and the slider contacting the door frame to facilitate an elastic opening or closing operation from the door frame.

15. The safety door according to claim 8, wherein the door further comprises:

a fixing member elastically provided on at least either of the rotor and the slider contacting the door frame to facilitate an elastic opening or closing operation from the door frame.

16. The safety door according to claim 1, wherein the stopper comprises:

at least one locking step formed on at least one surface of the protrusion or the guide groove; and a locking projection formed on a corresponding surface that faces the locking step, whereby, when the slider moves along the rotary body, the locking projection is supported by the locking step, and thus the width of the door is restricted not to be extended beyond an inner size of the door frame.

17. The safety door according to claim 16, wherein the door further comprises:

a fixing member elastically provided on at least either of the rotor and the slider contacting the door frame to facilitate an elastic opening or closing operation from the door frame.

18. The safety door according to claim 1, wherein the stopper comprises:

at least one seating groove formed in at least one surface of the protrusion or the guide groove; and an elastic ball formed on a corresponding surface that faces the seating groove, whereby, as the slider moves along the rotary body, the elastic ball is elastically supported by the seating groove, and a position of the slider can be adjusted in stages according to a position and a number of the seating groove.

19. The safety door according to claim 18, wherein the door further comprises:

a fixing member elastically provided on at least either of the rotor and the slider contacting the door frame to facilitate an elastic opening or closing operation from the door frame.

20. The safety door according to claim 1, further comprising:

a guide portion provided on at least an upper portion of the door or on each of upper and lower portions thereof, thus guiding the overlapping of the rotary body with the slider.

21. The safety door according to claim 20, wherein the guide portion comprises:

a tubular guide rail coupled with the rotary body; and a roller portion having a plurality of guide rollers that are continuously arranged, slidably moved into the guide rail, and coupled with the slider.

22. The safety door according to claim 21, wherein the door further comprises:

a fixing member elastically provided on at least either of the rotor and the slider contacting the door frame to facilitate an elastic opening or closing operation from the door frame.

23. The safety door according to claim 20, wherein the door further comprises:

a fixing member elastically provided on at least either of the rotor and the slider contacting the door frame to facilitate an elastic opening or closing operation from the door frame.

24. The safety door according to claim 1, wherein the door further comprises:

a fixing member elastically provided on at least either of the rotor and the slider contacting the door frame to facilitate an elastic opening or closing operation from the door frame.

25. The safety door according to claim 1, wherein the stopper is provided on at least the upper portion of the door or on each of the upper and lower portions thereof.

* * * * *